US006766074B1

(12) United States Patent
Dingel et al.

(10) Patent No.: US 6,766,074 B1
(45) Date of Patent: Jul. 20, 2004

(54) DEMULTIPLEXER/MULTIPLEXER WITH A CONTROLLED VARIABLE PATH LENGTH DEVICE

(75) Inventors: Benjamin B. Dingel, Painted Post, NY (US); Shamino Y. Wang, San Jose, CA (US)

(73) Assignee: Corning Incorporated, Corning, NY (US)

( * ) Notice: Subject to any disclaimer, the term of this patent is extended or adjusted under 35 U.S.C. 154(b) by 301 days.

(21) Appl. No.: 09/930,722

(22) Filed: Aug. 15, 2001

(51) Int. Cl.⁷ .................................................. G02B 6/28
(52) U.S. Cl. ........................................................ 385/24
(58) Field of Search ............................. 385/24, 15–23, 385/147, 125, 140, 33, 34

(56) References Cited

U.S. PATENT DOCUMENTS

| | | | |
|---|---|---|---|
| 4,575,179 A | * | 3/1986 | Lee et al. ........................ 385/6 |
| 5,002,350 A | | 3/1991 | Dragone |
| 5,136,671 A | | 8/1992 | Dragone |
| 5,339,157 A | | 8/1994 | Glance et al. |
| 5,414,548 A | | 5/1995 | Tachikawa et al. |
| 5,745,616 A | | 4/1998 | Zirngibl |
| 5,862,279 A | | 1/1999 | Amersfoort et al. |
| 5,881,199 A | | 3/1999 | Li |
| 5,960,132 A | | 9/1999 | Lin |
| 5,982,960 A | | 11/1999 | Akiba et al. |
| 6,014,390 A | | 1/2000 | Joyner |
| 6,055,078 A | | 4/2000 | Chen et al. |
| 6,062,681 A | | 5/2000 | Field et al. |
| 6,069,990 A | | 5/2000 | Okawa et al. |
| 6,111,996 A | | 8/2000 | Thompson |
| 6,112,000 A | | 8/2000 | Bergmann et al. |
| 6,137,606 A | | 10/2000 | Wu et al. |
| 6,137,939 A | | 10/2000 | Henry et al. |
| 6,137,941 A | | 10/2000 | Robinson |
| 6,141,467 A | | 10/2000 | Doerr |
| 6,212,308 B1 | | 4/2001 | Donald |
| 6,330,102 B1 | * | 12/2001 | Daneman et al. ........... 359/290 |

OTHER PUBLICATIONS

U.S. patent application Ser. No. 09/604,039, Caracci et al., filed Jun. 27, 2000.
U.S. patent application Ser. No. 09/483,669, Coulliard, filed Jan. 14, 2000.
U.S. patent application Ser. No. 09/603,550, Hemenway et al., filed Jun. 26, 2000.
U.S. patent application Ser. No. 09/431,430, Leslie et al., filed Nov. 1, 1999.
C. Dragone, IEEE Photonics Technology Letters, vol. 3, No. 9, pp. 812–815 (Sep. 1991) "An NxN Optical Multiplexer Using a Planar Arrangement of Two Star Couplers".
L.Y. Linn, IEEE Journal of Selected Topics in Quantum Electronics, vol. 5, No. 1, pp. 4–9 (Jan./Feb. 1999), "Free–Space Micromachined Optical Switches for Optical Networking".

(List continued on next page.)

Primary Examiner—J. F. Duverne
(74) Attorney, Agent, or Firm—Gregory V. Bean

(57) ABSTRACT

A multiplexing/demultiplexing optical device comprises a beam distribution element to receive an input optical signal comprising one or more wavelengths and to distribute the optical signal into a plurality of beams. The optical device also comprises a variable path length element to receive the distributed optical signal from the first optical element, where the variable path length element comprises a plurality path sections, where a length of at least one of the path sections is variable. The optical device further comprises a beam interaction element to receive the plurality of beams from the variable path length element, wherein the plurality of beams are combined and allowed to interfere, and are thereby demultiplexed. A controller operatively coupled to the variable path length element can be provided to programmatically vary the length of one or more of the path sections. The variable path length element can include an optical switch fabric, such as a two dimensional switch fabric or a three dimensional switch fabric.

34 Claims, 16 Drawing Sheets

OTHER PUBLICATIONS

Lih Y. Linn, IEEE Photonics Technology Letters, vol. 12, No. 7, pp. 885–887 (Jul. 2000), "Integrated Signal Monitoring and Connection Verification in MEMS Optical Crossconnects".

C.R. Doerr, OSA TOPS, vol. 29 WDM Components, pp. 2–11 (1999), "Cascaded planar waveguide arrays".

C.R. Doerr, IEEE Photonics Technology Letters, vol. 11, No. 2, pp. 197–199 (Feb. 1999), "Proposed Optical Cross Connect Using a Planar Arrangement of Beam Steerers".

K. Okamoto, IEEE Electronics Letters Online No. 19951061 (Aug. 31, 1995), vol. 31, No. 18, pp. 1592–1594 "Fabrication of variable bandwidth filters using arrayed–waveguide gratings".

C.R. Doerr, IEEE Photonics Technology Letters, vol. 10, No. 4, pp. 528–530 (Apr. 1998), "Proposed WDM Cross Connect Using a Planar Arrangement of Waveguide Grating Routers and Phase Shifters".

C.R. Doerr, IEEE Photonics Technology Letters, vol. 11, No. 11, pp. 1437–1439 (Nov. 1999), "40–Wavelength Add–Drop Filter".

C.R. Doerr, IEEE Photonics Technology Letters, vol. 11, No. 5, pp. 557–559 (May 1999), "Arrayed Waveguide Lens Wavelength Add–Drop in Silica".

O. Ishida, Journal of Lightwave Technology, vol. 15, No. 2, pp. 321–337 (Feb. 1997), "Digitally Tunable Optical Filters Using Arrayed Waveguide Grating (AWG) Multiplexers and Optical Switches".

L.Y. Lin, Journal of Lightwave Technology, vol. 18, No. 4, pp. 482–489 (Apr. 2000), "On the Expandability of Free–Space Micromachined Optical Cross Connects".

L.Y. Lin, IEEE Photonics Technology Letters, vol. 10, No. 10, pp. 382–384 (Mar. 1998), "A Low–Loss 16–Channel Polarization Dispersion Compensated PHASAR Demultiplexer".

L.Y. Lin, IEEE Photonics Technology Letters, vol. 10, No. 10, pp. 1425–1427 (Oct. 1998), "High–Density Micromachined Polygon Optical Crossconnects Exploiting Network Connection Symmetry".

H. Yamada, Electronics Letters Online No. 19971151, vol. 33, No. 10, (Sep. 25, 1997), "Low–crosstalk arrayed–waveguide grating multi/demultiplexer with phase compensating plate".

* cited by examiner

DEMULTIPLEXER/MULTIPLEXER WITH A CONTROLLED VARIABLE PATH LENGTH DEVICE

BACKGROUND OF THE INVENTION

1. Field of the Invention

This invention generally relates to the field of optical devices, and more particularly to a controllable demultiplexer/multiplexer.

2. Description of the Related Art

Optical devices having phased arrays of waveguides, also referred to as Arrayed Waveguide Grating (AWG) devices, are often used for optical multiplexing and demultiplexing applications in optical networks. AWGs, in particular, are suitable for handling inputs having a large number of wavelengths (or channels). AWGs are conventionally planar devices having a plurality of substantially parallel waveguides, each differing in length from its nearest neighbors, coupling two opposing star couplers. Most conventional AWGs are passive devices, such as shown in U.S. Pat. No. 5,002,350.

For example, a schematic of a conventional AWG is shown in FIG. 1. The corresponding spectral output response of the conventional AWG is shown in FIG. 2. In this conventional planar design, the conventional AWG 1 includes an input slab 30, a waveguide array 45, and an output slab 50. Input slab 30 can operate as a 1×N splitter. In FIG. 1, the input signal 10 enters at the entrance plane of the slab 30 through one of the input port(s) 20-1, ..., 20-s. The optical signal spreads throughout the "free-space" slab 30, and is distributed among M number of ports at side 31 of the slab 30.

Waveguide array 45 includes M number of substantially parallel planar waveguides 45-1, ..., 45-m, having path lengths $l_1, \ldots, l_m$. Adjacent waveguides have an incremental path length difference of $\Delta l = l_x - l_{x-1}$. The waveguides 45-1, ..., 45-m end with ports 40-1, ..., 40-m on side 51 of output slab 50. The output ports 40-1, ..., 40-m are considered in the art to form a diffraction grating. Output slab 50 provides M×N coupler operation in which the M signals coming from M parallel waveguides 45-1, ..., 45-m are combined and allowed to interfere, such that each wavelength is directed to converge on a different output port 65-1 to 65-n of the device at side 57 of the slab 50. All these parts can be formed on a silicon substrate by conventional means. See e.g., C. Dragone, IEEE Photonics Technology Letters, vol. 3, no. 9, pp. 812–815 (September 1991). Once the AWG is fabricated, all the path lengths of the different arms are fixed, which makes the device's wavelength spacing permanent because channel spacing is generally determined by the incremental path difference $\Delta l$ of the waveguide array 45 of the AWG.

As mentioned above, conventional AWGs utilize substantially parallel waveguides that are permanently fixed in their respective physical path lengths. The impact of this fixed physical path length difference $\Delta l$ on current DWDM network system when these AWGs are deployed is the predetermination of the overall channel spacing $\Delta \lambda$ of the whole network. This decision affects all network components and equipment deployed in the network such as: OADM, WADM, OXC, laser wavelength channels, etc. Once this optical network is deployed, any future upgrade (in terms of increasing the number of wavelength channels by reducing the channel spacing) would require replacing all these previously deployed AWGs with new AWGs having narrower channel spacing. Another approach is to complement all the deployed AWGs with optical interleaved filter (OIF) pairs by engineering them in the network. These upgrade scenarios are necessary when the optical amplifier's useful spectral range reaches its limit.

In both of these approaches, the development and implementation of hardware upgrades are expensive, time consuming and could result in a more complicated overall network. Furthermore during the upgrade, part of the network operation must be taken off-line or shut down in order for the deployed AWGs to be replaced.

SUMMARY OF THE INVENTION

According to one embodiment of the present invention, an optical device comprises a beam distribution element to receive an input optical signal comprising one or more wavelengths and to distribute the optical signal into a plurality of beams. The optical device also comprises a variable path length element to receive the distributed optical signal from the beam distribution element, where the variable path length element comprises a plurality of path sections, where a length of at least one of the path sections is variable. The optical device further comprises a beam interaction element to receive the plurality of beams from the variable path length element, wherein the plurality of beams interact such that each wavelength can propagate to a different output. The optical device can further include a plurality of exit ports to receive the demultiplexed beams, where a first exit port receives a first demultiplexed optical signal having a first wavelength and a second exit port receives a second demultiplexed optical signal having a second wavelength different from the first wavelength. A controller operatively coupled to the variable path length element can be provided to vary the length of one or more of the path sections. The variable path length element can include an optical switch fabric, such as a two dimensional switch fabric or a three dimensional switch fabric.

In a preferred aspect of this embodiment, the variable path length element can be constructed from an optical switch fabric based on an array of MEMS mirrors, a liquid crystal based switching array, or a bubble type switching array. In an alternative aspect of this embodiment, the variable path length element can be based on a three dimensional switch fabric constructed from opposing moveable mirror arrays.

In another preferred aspect of this embodiment, the variable path length element comprises a MEMS mirror switch array, where at least one of the mirrors is tiltable or partially actuatable to provide variable optical attenuation of the reflected optical signal. In other preferred aspects of this embodiment, the variable path length element can include a liquid crystal based switching array, a bubble type switching array, or a combination of MEMS, liquid crystal and/or bubble type switching arrays, in which at least one of the switching elements is partially actuatable to provide variable optical attenuation of the reflected optical signal.

According to another embodiment of the present invention, a method of demultiplexing a multiplexed optical signal includes distributing the optical signal into a plurality of beams; directing the plurality of beams to a variable path length element, wherein the variable path length element comprises a plurality of path sections corresponding to a number of distributed beams, wherein a first beam of the plurality of beams propagates along a first path section and a second beam of the plurality of beams propagates along a second path section, wherein the first path section is set to a first path length in a first state and the first path section is set to a second path length in a second state, wherein the first and second path lengths are different, wherein the second path section is set to a third path length in a first state and the second path section is set to a fourth path length in a second state, wherein the third and fourth path lengths are different; and directing the first and second beams from the variable path length element into a beam interaction element, wherein a first exit port receives a first output beam having a first wavelength and a second exit port receives a second output beam having a second wavelength, said first and second wavelengths being different.

The devices and methods of the present invention results in a number of advantages over prior art devices and methods. The channel spacing of the demultiplexer devices of the current invention may be changed by the user, allowing greater flexibility in network design and implementation.

It is to be understood that both the foregoing general description and the following detailed description are merely exemplary of the invention, and are intended to provide an overview or framework to understanding the nature and character of the invention as it is claimed.

Other advantages and novel features of the present invention will become apparent from the following detailed description of the invention when considered in conjunction with the accompanying drawings.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art to make and use the invention.

DETAILED DESCRIPTION OF THE PREFERRED EMBODIMENTS

The present invention is generally related to optical multiplexer/demultiplexer devices and is related, in particular, to a multiplexer/demultiplexer device having a controllable variable path length element. The multiplexer/demultiplexer device of the present invention can be designed in a planar configuration, a non-planar configuration, or a combination of the two. In a preferred planar design, the multiplexer/demultiplexer device acts as an arrayed waveguide grating (AWG) device with arrayed waveguides having controllable variable physical path lengths, as opposed to permanent, fixed path lengths as found in conventional AWGs. By controlling the path lengths of the multiplexer/demultiplexer device of the present invention, an optical system containing the multiplexer/demultiplexer device that includes a controllable variable path length element can be upgraded remotely without the need to physically replace the device should the number of communicated channels or the channel spacing be changed.

Figure 3:
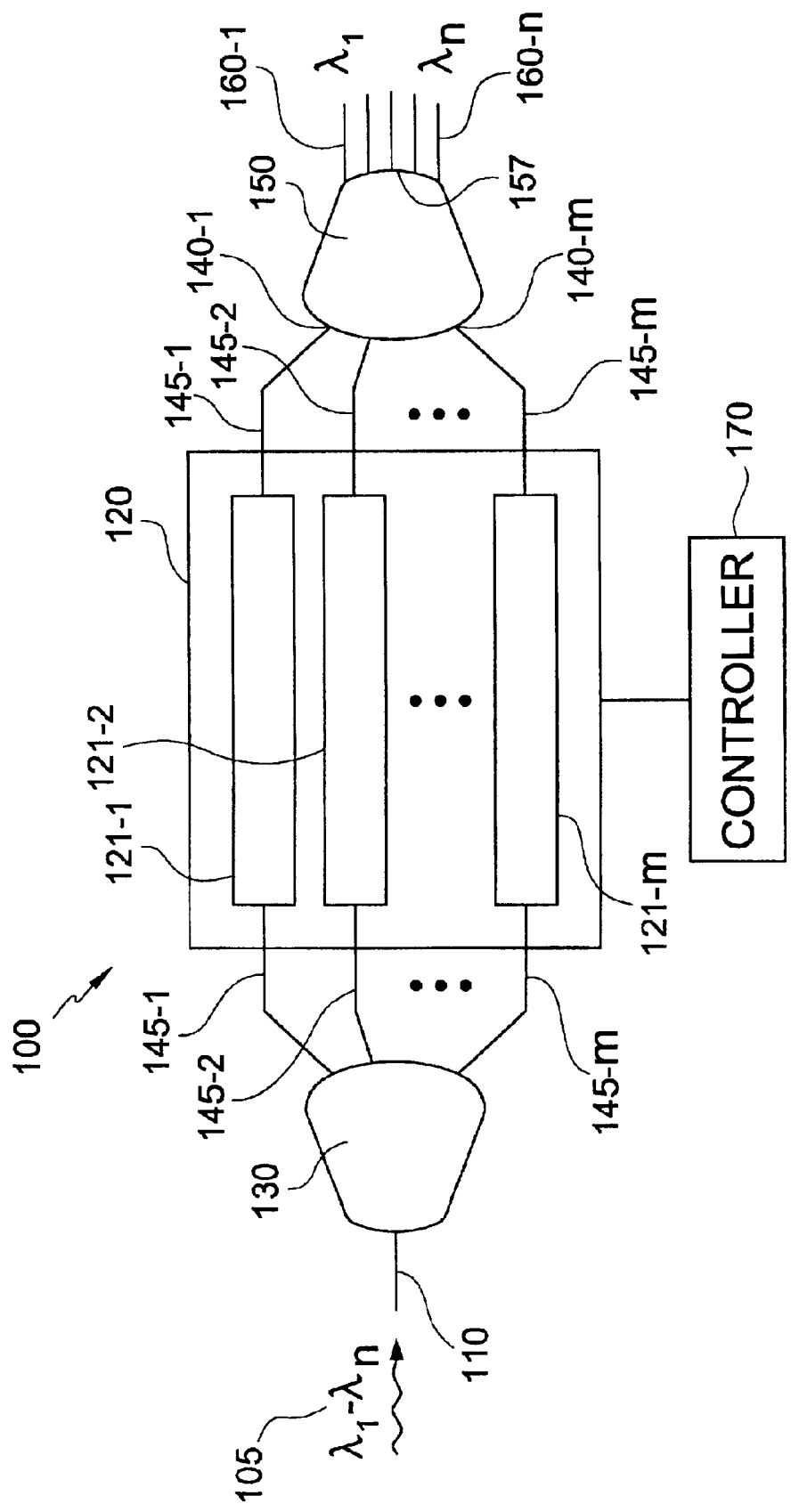
FIG. 3 is a schematic diagram of a multiplexer/demultiplexer device having a controlled variable path length element according to an embodiment of the present invention.

FIG. 3 shows a multiplexer/demultiplexer device 100 having a controllable variable path length element according to a first embodiment of the present invention. The device 100 can be integrated on a substrate (not shown) made from a suitable material, such as silica, silicon, glass, or a III–V semiconductor, as would be apparent to one of ordinary skill in the art given the present description.

A beam distribution element 130 receives an input optical signal 105 at an input, such as waveguide 110. The optical signal 105 can comprise one or more wavelengths, such as a multiplexed (WDM or DWDM) optical signal having wavelengths $\lambda_1$–$\lambda_n$. The beam distribution element 130 can be a planar device or a non-planar device. The beam distribution element splits the input optical signal into a plurality of m beams, allowing them to expand spatially to multiple outputs. For example, the beam distribution element 130 can be a planar device such as, for example, a slab waveguide or a star coupler, or a non-planar device such as, for example, a microoptic beam splitter device, a lens, or a lens array.

Beam distribution element 130 distributes the optical signal 105 into a plurality of light beams that propagate along paths 145-1, ..., 145-m. Each path 145-1, ..., 145-m travels through variable path length element 120. The connection or bridge between beam distribution element 130 and the variable path length element 120 can be a coupling structure such as a plurality of optical fibers, a plurality of waveguides or optical lenslet collimators. The coupling structure can also comprise a homogeneous medium, such as, for example, a volume of air or a piece of glass.

The variable path length element 120 receives the distributed optical signal from the beam distribution element 130 in the form of m light beams. Variable path length element 120 includes a plurality of m path sections 121-1 to 121-m, wherein the physical length of at least one of the path sections 121-1 to 121-m is controllably variable. The variable path length element 120 serves to controllably change the path length of one or more of the paths 145-1, ..., 145-m. For example, path 145-m has a length of $l_m = l_{m,u} + \xi_m$, where $l_{m,u}$ is the path length of path 145-m when path section 121-m is in an unactuated state, and $\xi_m$ is the physical length added to the path when path section 121-m is in an actuated state. Preferably, each path section 121-1, ..., 121-m of the variable path length element 120 can be actuated to add a variety of $\xi$ values to one or more of the lengths of the paths 145-1, ..., 145-m. Preferably, the physical lengths of each of the path sections 121-1 to 121-m can be controlled so that a controlled and variable delay can be imparted to one or more of the light beams propagating along the paths 145-1, ..., 145-m. As is described in further detail below with respect to the various embodiments of the present invention, the variable path length element 120 can be a planar device, or a non-planar device, such as, for example, a two dimensional switch fabric (e.g., using MEMS switching, liquid crystal switching, bubble switching, and/or Mach Zehuder interferometer switches), or a three dimensional switching element or device.

In one embodiment of the invention, the unactuated path lengths of the paths 145-1, ... 145-m are chosen such that each path has a different unactuated path length. For example, adjacent unactuated paths may have a difference in path length of $\Delta l$. Such a device is operative as a demultiplexer/multiplexer in the unactuated state. This allows the device to be implemented passively initially, with actuation required only when a change from the initial channel spacing is desired.

Also, in this example, a controller 170 can be coupled to the variable path length element 120 in order to control one or more of the lengths of the path sections 121-1 to 121-m. Because system requirements can be subject to change, the controller 170 can be designed to further include sufficient programmable memory (e.g., EPROMs and the like) to receive and implement additional operating software and/or commands from a system controller or network management system. For example, in a first state, the controller can set the physical length of the first path section to be a first path length. In a second state, the controller can set the physical length of the first path section to be a different path length. Similarly, each of the lengths of the remaining path sections can be set to different path lengths, depending on system requirements.

With none, some, or all of the light beams having undergone a same or different controlled delay within variable path length element 120, the light beams are directed to a beam interaction element 150. Beam interaction element 150 can be a planar device such as, for example, a slab waveguide or a star coupler, or a non-planar device such as, for example, a microoptic beam splitter device, a lens, or a lens array. The connection or bridge between the variable path length element and the beam interaction element 150 can be a coupling structure such as a plurality of optical fibers, a plurality of waveguides or optical lenslet collimators, or may include a homogeneous medium, such as, for example, a volume of air or a piece of glass.

The interaction of the beams in device 150 can be a demultiplexing, multiplexing, diffraction or other interaction. In the example of FIG. 3, a demultiplexing interaction is provided, where the paths 145-1, ..., 145-m are coupled to the beam interaction element 150 through ports 140-1, ..., 140-m. In beam interaction element 150, the beams entering through ports 140-1, ..., 140-m are combined and allowed to interfere with one another creating a diffraction pattern, whereby the result is a plurality of demultiplexed signals with wavelengths $\lambda_1 - \lambda_n$. Alternatively, the variable path length element can be in an unactuated state, and thus impart no optical transformation to the beams. In such a case, the interaction of the beams in device 150 will be negligible and the beams of wavelengths $\lambda_1 - \lambda_n$ emerge from the device 150 will be substantially unchanged from the initial signal that entered the system. These individual signals can be further communicated to an optical system (not shown) via output ports 160-1 to 160-n, which are disposed along side 157 of optical element 150.

As the beams entering through ports 140-1, ..., 140-m may each have propagated along paths of different path length, the paths 145-1, ..., 145-m, in effect form a diffraction grating. Since the difference in path length between paths is controllable, the effective spacing of the diffraction grating formed by ports 140-1, ..., 140-m is controllable. As the person of skill in the art will appreciate, the ability to control the effective grating spacing by control of the path length difference between paths allows the channel spacing of the demultiplexer to be controlled.

Figure 4:
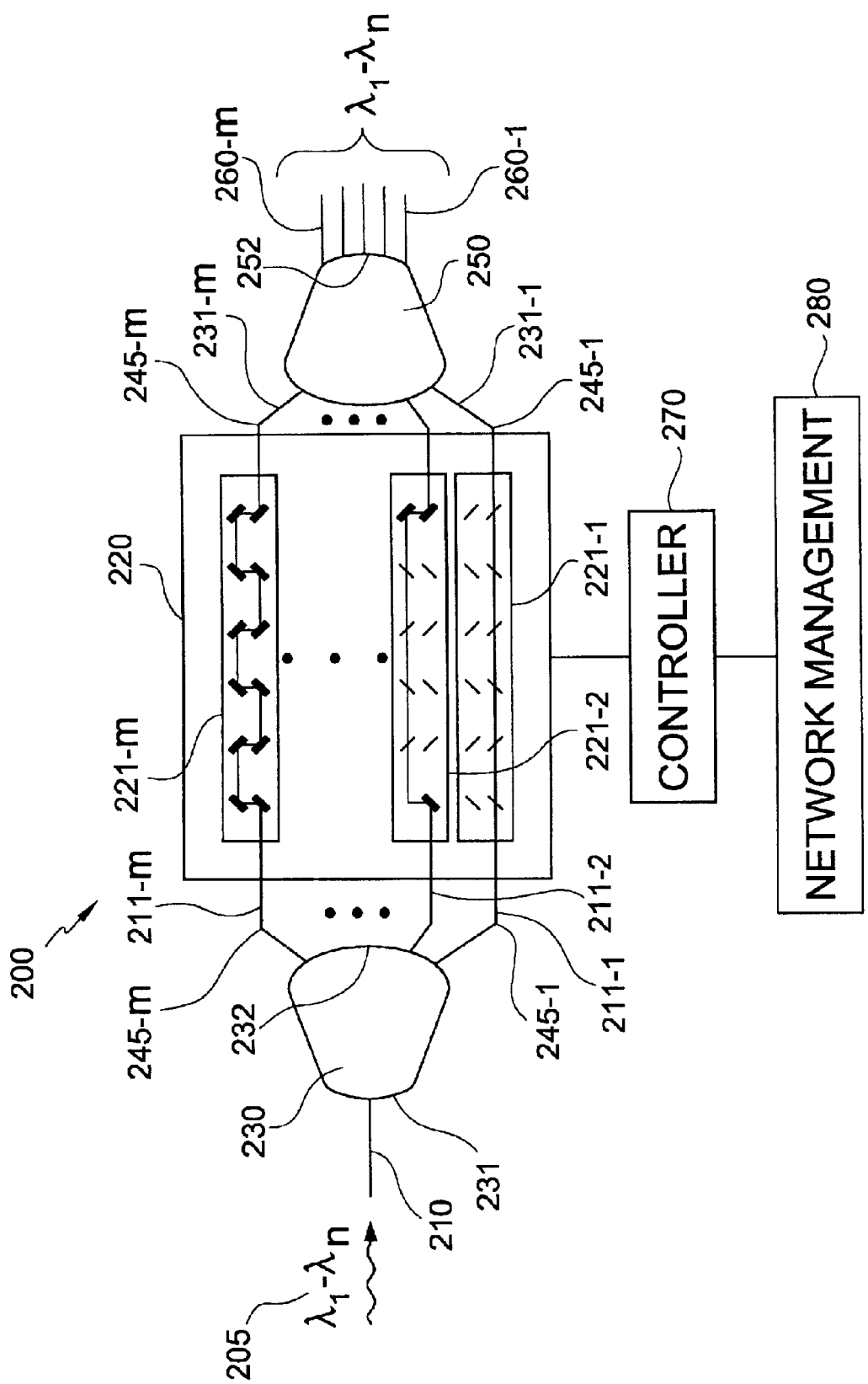
FIG. 4 is a schematic diagram of a planar multiplexer/demultiplexer device having a controlled variable path length element operating as a controllable AWG according to another embodiment of the present invention.

FIG. 4 shows a preferred embodiment of the present invention, a controllable planar multiplexer/demultiplexer device 200 having a variable path length element 220. In this embodiment, the variable path length element 220 may be two dimensional optical switch fabric, such as those known in the art. According to the present invention, the optical switch fabric can be based on, for example, a two dimensional MEMS switching device, a liquid crystal based cross-connect switch, a cascade of Mach-Zehnder interferometers, a bubble-based optical switch fabric, and/or other optical switch fabric technologies familiar to those of skill in the art.

In the MEMS-based example shown in FIG. 4, the device 200 operates as a demultiplexer. As would be apparent to one of ordinary skill in the art given the present description, device 200 could instead be configured to operate as a multiplexer by reversing the direction of the optical signals.

A beam distribution element 230 receives an input optical signal 205 at an input, such as waveguide 210. The optical signal 205 can comprise one or more wavelengths, such as a multiplexed (WDM or DWDM) optical signal having wavelengths $\lambda_1 - \lambda_n$. Preferably, the optical signal 205 is a WDM signal having a center wavelength in the S-, C-, or L-wavelength band (for example in the C-band at about 1550 nm), with an ITU standard spacing such as 100 GHz or 50 GHz between adjacent wavelength channels.

Beam distribution element 230, in this preferred embodiment, is a planar device, such as, for example, an optical slab, and distributes the multiplexed signal into a plurality of light beams directed along paths 245-1, ..., 245-m. For example, the input signal 205 enters through one of the inputs of beam distribution element 230 at the entrance plane 231, is distributed throughout the coupler, and exits through m ports at output side 232. In this preferred example, paths 245-1, ..., 245-m include planar waveguides 211-1, ..., 211-m, which transmit the distributed optical signal to the variable path length element; the path sections 221-1, ..., 221-m of variable path length element 220; and waveguides 231-1, ..., 231-m, which transmit the distributed optical signal from the variable path length element to a beam interaction element 250.

Thus, the connection or bridge between beam distribution element 230 and the variable path length element 220 in this preferred example is the set of planar waveguides 211-1, ..., 211-m, where each of the waveguides 211-1, ..., 211-m can receive a portion of the optical signal 205. In this example, each of waveguides 211-1, ..., 211-m is coupled to a receiving end of a path section 221-1, ..., 221-m of variable path length element 220, and the output side 232 of beam distribution element 230.

Variable path length element 220 includes a plurality of m path sections 221-1, ..., 221-m, where the physical length of each of the path sections 221-1, ..., 221-m can be variably controlled, as instructed by the controller 270. Thus, variable path length element 220 can control the lengths of paths 245-1, ..., 245-m ($l_1, ..., l_m$). As shown in FIG. 4, and in expanded view in FIG. 5, the variable path length element 220 can be constructed using a MEMS-based optical switch fabric having a multiplicity of switching elements that can be actuated to be placed in the beam path or de-actuated to be removed from the beam path. For example, the MEMS-based switch fabric can be constructed using MEMS cantilevered mirrors positioned in slots formed at intersection points of an array of orthogonal planar waveguides. Thus, when a mirror is actuated into the beam path, a beam is reflected into an orthogonal waveguide towards another mirror, which can then direct the beam towards additional mirrors until reaching the output region. If a mirror is not actuated, the beam passes straight through the crosspoint. Thus, the switch fabric can be constructed to impart one or more reflections to create a different (and controllable) path length. An example MEMS switch construction is described in detail in commonly pending and co-owned application Ser. No. 09/483,669, filed on Jan. 14, 2000, which is incorporated by reference in its entirety. In the expanded view of FIG. 5, the waveguides of the variable path length element are denoted by dashed lines, and the optical path as actuated is shown as an unbroken line. Actuated mirrors are shown as heavy line segments, such as 242, and unactuated mirrors are shown as thin line segments, such as 241.

Figure 5:
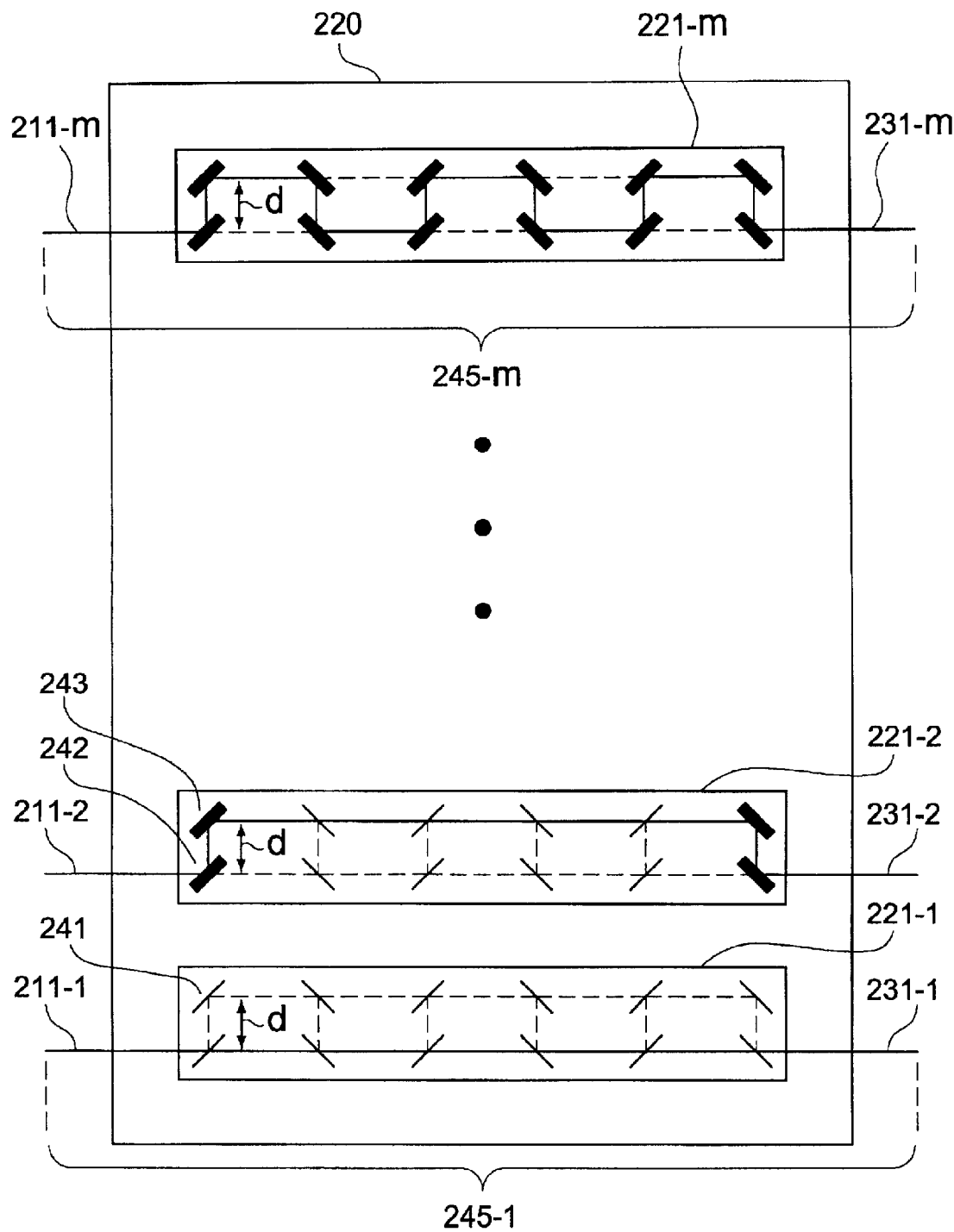
FIG. 5 is a close up view of the controlled variable path length element of FIG. 4.
Figure 6:
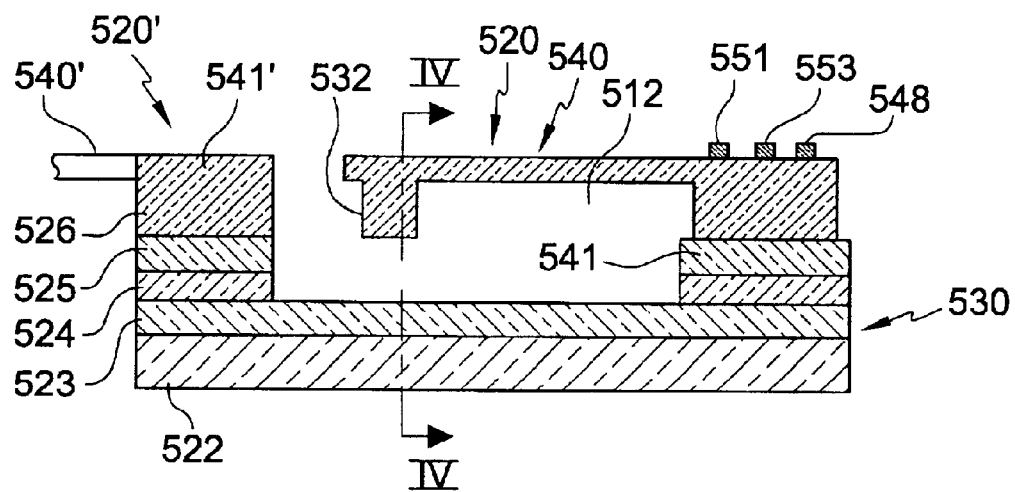
FIG. 6 is a side view of an example construction of a MEMS switch.
Figure 7:
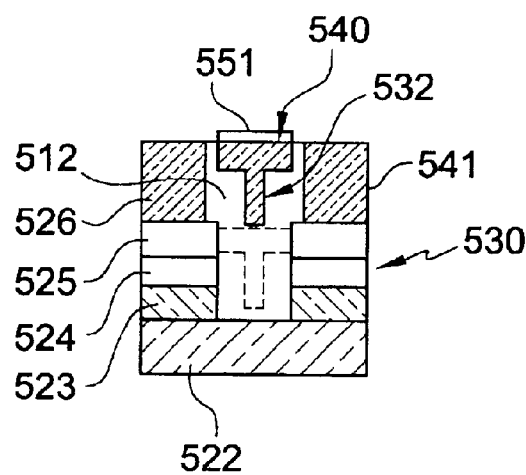
FIG. 7 is another side view of an example construction of a MEMS switch.

For example, an individual MEMS switch element 242 can be constructed as is shown in FIGS. 6 and 7. This individual switch element 242 can be part of a multiplicity of switches distributed in a two dimensional array, such as indicated in FIG. 5. In FIG. 6, for example, a planar lightwave optical circuit 530 has a substrate 522 of silica, on which there is deposited in a conventional manner a doped silica under cladding 523, a doped silica waveguide 524 and a doped silica over cladding 525. Interrupting the waveguide 524 is a slot 512 which selectively allows a mirror 532 integrally formed at the end of a cantilevered arm 540 to selectively move between a position distal from slot 512, as shown in FIGS. 6 and 7, to a position within the slot, as shown in phantom lines in FIG. 7 and in the optical pathway of the waveguide 524. Further, in order to avoid the necessity of a continuous application of a control signal, a latching structure can alternatively be provided to selectively latch the MEMS switch in a reflecting position in the slot.

The techniques used to activate a MEMS-based mirror switch can vary, as would be apparent to one of ordinary skill in the art given the present description. For example, a MEMS mirror can be moved in and out of an intersection slot by thermal actuation, by magnetic actuation, or by piezoelectric actuation.

The necessary path differences $\Delta l$ between adjacent paths that the m number of paths 245-1, ..., 245-m are realized by the actuation of different routes traversed by the beams within the variable path length element, embodied in this example as a MEMS mirror switch having a path length between mirrors of d. For example, in FIG. 5, path section 221-1 is unactuated, and adds no length to path 245-1 ($\xi_1=0$). In path section 221-2, MEMS mirror element 242 is actuated, thereby directing the incident beam toward switch 243. MEMS mirror element 243 is actuated, directing the incident beam along the upper waveguide of path section 221-2. In a similar fashion, the beam is directed to the waveguide 231-2. The length $\xi_2$ added to the path 245-2 is 2d. The remaining path sections, up to 221-m, can be configured as would be apparent to one of ordinary skill in the art given the present description to provide appropriate delays, depending on the optical signal parameters and the desired output. In this example, the path section 221-m is actuated to add a length $\xi_m=6d$ to path 245-m.

Figure 8:
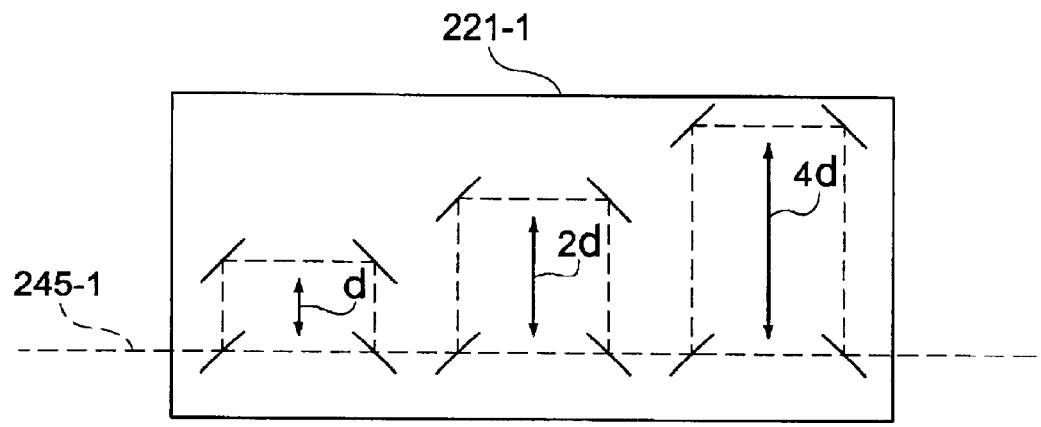
FIGS. 8 and 9 are schematic views of alternate embodiments of controlled variable path length elements.
Figure 9:
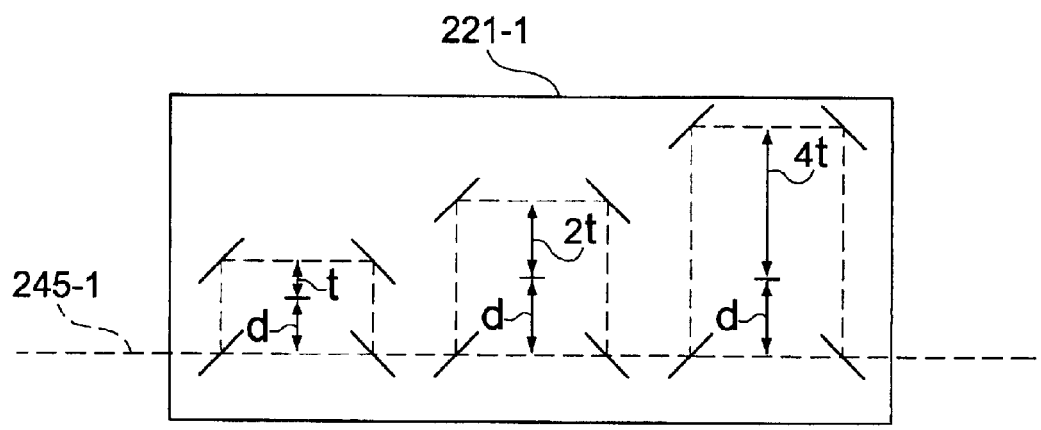

The distances between mirror elements of the variable path length element is not necessarily a constant, as it is in the example of FIG. 5, above. In a second exemplary embodiment, shown in FIG. 8, the path length between mirror elements varies along each of the path sections 221-1, ..., 221m. For example, in the path section 221-1 shown in FIG. 8, the first two pairs of mirrors are spaced at a distance d in the direction orthogonal to the axis of the optical paths 245-1, ..., 245-m. The next two pairs of mirrors are spaced at a distance 2d, and the third two pairs of mirrors are spaced at a distance 4d. By actuating these mirrors, path length increases of 2d, 4d, 6d, 8d, 10d, and 12d are possible. Alternatively, as shown in FIG. 9, the mirror spacing may vary by a smaller amount. In FIG. 9, the mirror spacing for the first two pairs of mirrors is d+t, with the second two pairs of mirrors spaced at d+2t, and the third two pairs of mirrors spaced at d+4t. By the actuation of the mirrors of FIG. 9, path section 221-1 may impart to path 245-1 a range of path length increases. To further increase the range of delays possible, a greater number of mirrors with spacings reflecting the "base two" pattern (e.g. d+t, d+2t, d+4t, d+8t, d+16t, d+32t., and so on) may be used. As the person of skill in the art will recognize, the mirror spacings should be chosen in accordance with the desired function of the device.

Referring back to FIG. 4, a controller 270 can be coupled to the variable path length element 220 in order to control one or more of the lengths of the path sections 221-1 to 221-m. Because system requirements can be subject to change, the controller 270 is designed to further include sufficient programmable memory (e.g. EPROMs and the like) to receive and/or implement additional operating software and/or commands from network management 280. For example, the following requirements of the controller can be managed: the timing requirements (such as transition time or complete time, synchronization time for all the mirrors in the multiplexer/demultiplexer module, and hold-on-time), and verification of the different path lengths inside the control path, among others.

After the m light beams acquire their respective delays within variable path length element 220, the m light beams are directed to a beam interaction element 250. In the planar configuration of this embodiment, the beam interaction element 250 can be, for example, a planar waveguide slab.

The connection or bridge between the path sections 221-1, ..., 221-m of the variable path length element 220 and the second optical element 250 is a plurality of receiving waveguides, 231-1 to 231-m, which receive the light beams from the path sections 221-1 to 221-m.

Beam interaction element 250 permits the now phase-shifted beams to interfere with one another, creating a diffraction pattern resulting in the demultiplexing of signals of wavelengths $\lambda_1$–$\lambda_n$. Preferably, the n demultiplexed signals are directed to an exit surface 252 of beam combining element 250. These individual signals having wavelengths $\lambda_1$–$\lambda_n$, respectively, can be communicated to the rest of the network via output ports 260-1 to 260-n.

Figure 10A:
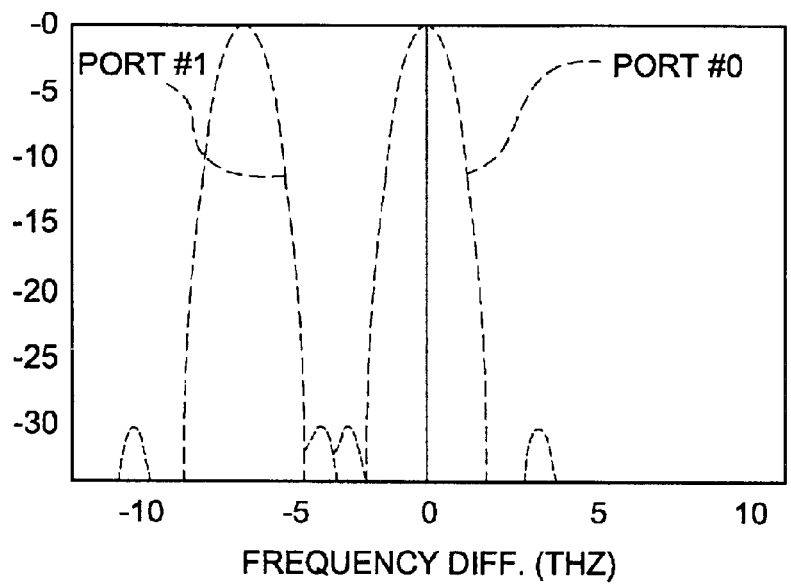
FIGS. 10A and 10B are example graphs of the output intensity as a function of frequency difference according to another embodiment of the present invention.
Figure 10B:
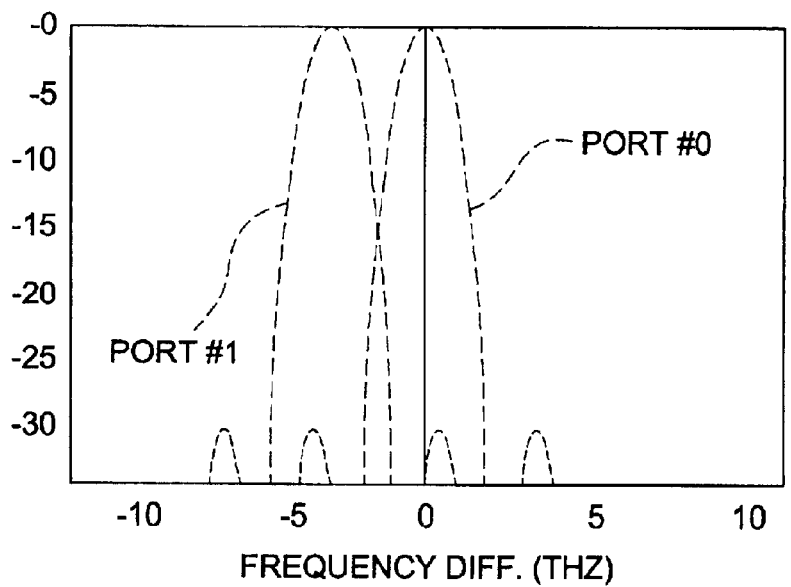
Figure 11:
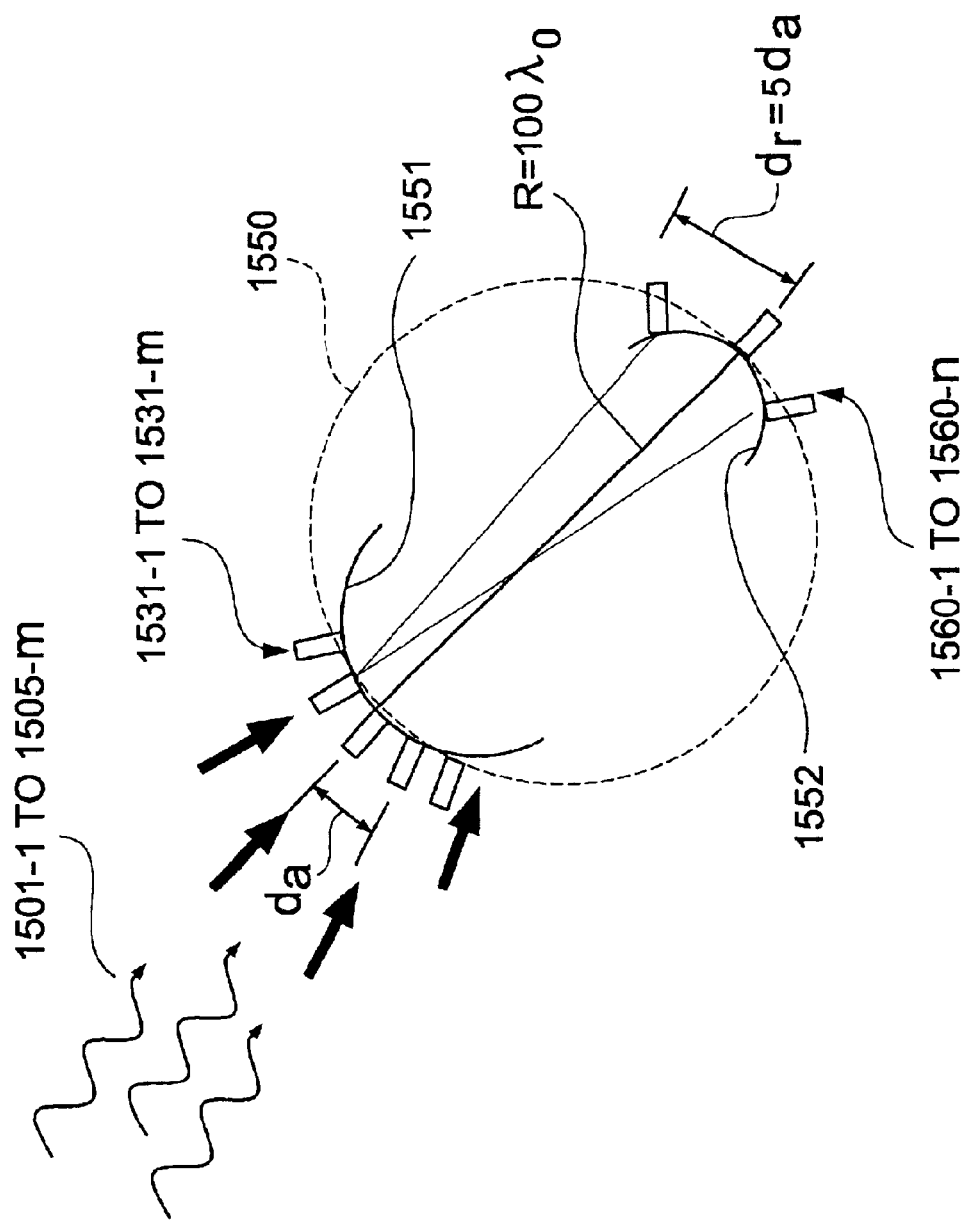
FIG. 11 is a schematic view an example structure used in calculating channel spacing requirements according to another embodiment of the present invention.

FIGS. 10A, 10B, and 11 depict an example showing control of demultiplexer channel spacing according to an embodiment of the present invention. In FIG. 11, the structure of an example beam interaction element 1550, such as an optical slab, is shown. This example structure is used as the basis for the simulations illustrated in FIGS. 10A and 10B. Here, the input beams (1505-1 to 1505-m) coming from the variable path sections are injected into the slab 1550 at entrance ports 1531-1 to 1531-m. The center frequency is given as $f_0$=200 THz ($\lambda_0$~1.5 μm). The center frequency is obtained from the known equation:

$$\text{central frequency: } m\lambda_0 = n_{eff}\Delta L, \quad \text{(Eq. 1);}$$

where m (=20 & 40 for the example two cases) is the diffraction order, $n_{eff}$ (=1) is the effective refractive index of a free-space MEMS-based variable path, and $\Delta L$ is the path length difference of the different variable path sections. In addition, the Free-Spectral Range (FSR) is given by:

$$FSR = c/(n_g \Delta L), \quad \text{(Eq. 2);}$$

where $n_g$ is the index of refraction of the slab ($n_g$=1.4) and c is the speed of light. In this simulation, the waveguide input ports 1531-1 to 1531-m (at plane 1551) are separated by a distance $d_a$=3$\lambda_0$. Correspondingly, the output waveguides 1560-1 to 1560-n (at plane 1552) can thus be separated by a distance $d_r$=5$d_a$. In this example, it is assumed the effective focus length of the slab is R=100$\lambda_0$. Also, the output waveguide at plane 1552 is assumed to have a form where no filtering effect takes place.

In FIGS. 10A and 10B, techniques known to the skilled artisan are used to calculate the output of the device. The crosstalk effect from the different waveguide channels is not taken into account. It is also assumed that the output waveguides (see e.g., output waveguides 260-1, ..., 260-n from FIG. 4) have rectangular profiles. It is also assumed that, as in FIG. 11, the center wavelength, $\lambda_0$, is 1.5 microns. It is further assumed that in the unactuated device, the unactuated paths, such as paths 245-1, ..., 245m (see e.g. FIG. 4) have an adjacent path length difference of $\Delta L$=300 μm. In FIG. 10A the output intensity as a function of frequency difference from the center frequency of 200 THz is plotted. The frequency at output port #1 is 7 THz from the center frequency when $\Delta L$=20$\lambda_0$. As shown in FIG. 10B, when the variable path length element is actuated so as to increase the adjacent path length difference to $\Delta L$=40$\lambda_0$, the frequency at output port #1 changes to 3.5 THz from the center frequency.

Thus, the effective wavelength channel spacing $\Delta\lambda$ of the multiplexer/demultiplexer device can be dynamically changed by a skilled artisan by altering the path lengths of the variable paths to output a demultiplexed signal.

Figure 12:
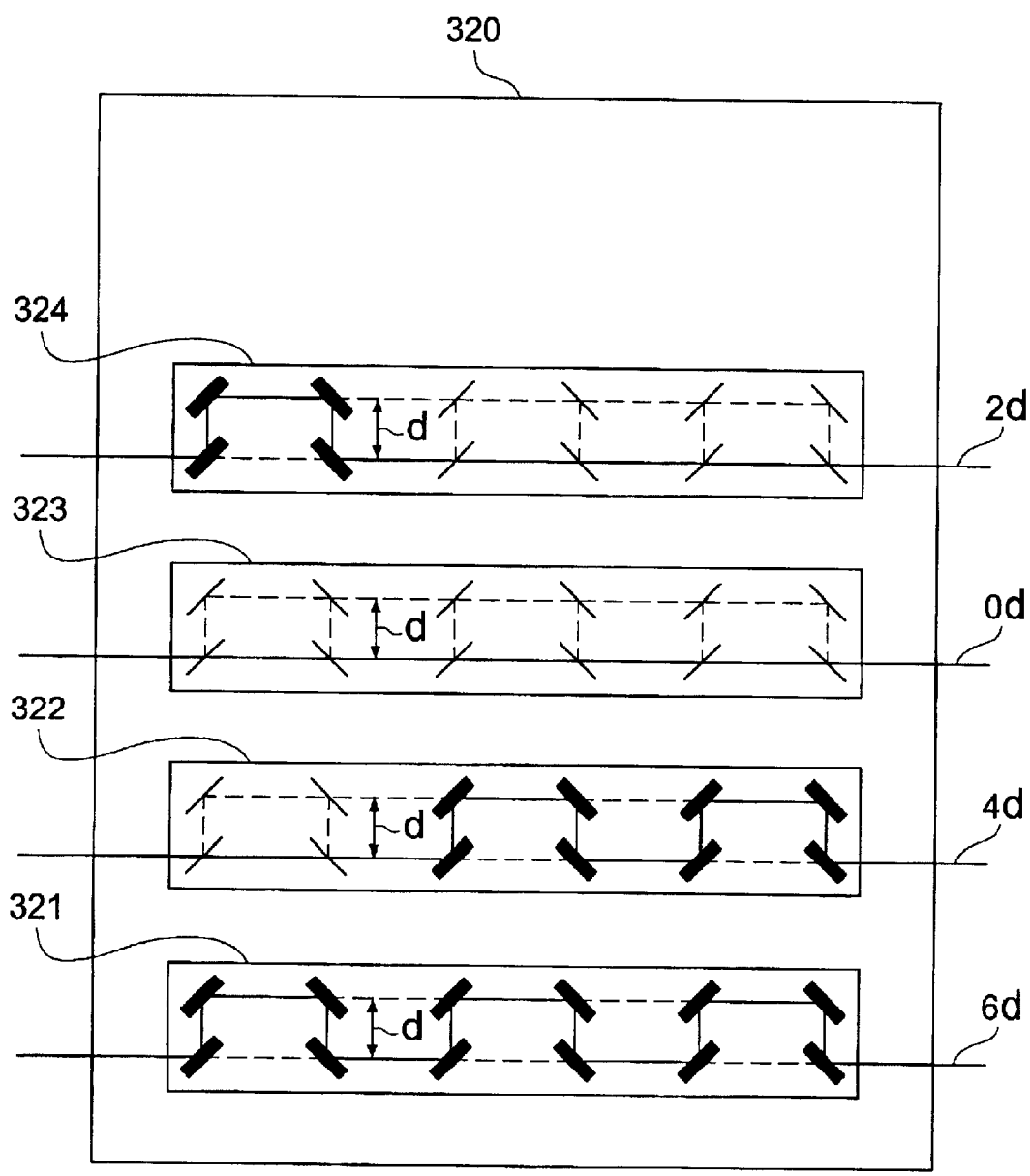
FIG. 12 is a schematic diagram of a multiplexer/demultiplexer device having a controlled variable path length element having a non-sequential path length arrangement according to another embodiment of the present invention.

In addition to the increasing sequence trend such as 0, 2d, 4d, etc., a non-sequential arrangement can be utilized, such as 6d, 4d, 0, 2d, and so on, which can provide some enhancement or change in the performance of the multiplexer/demultiplexer device. For example, FIG. 12 shows a variable path length element 320 having a MEMS-based optical switch fabric with a constant spacing between mirror elements of d. In this embodiment, path section 321 imparts an additional path length of 6d, path section 322 imparts an additional path length of 4d, unactuated path section 323 imparts no additional path length difference of 0, and path section 324 imparts an additional path length of 2d. Other non-sequential path length increase arrangements can be readily achieved, as would be apparent to one of ordinary skill in the art given the present description.

Figure 13:
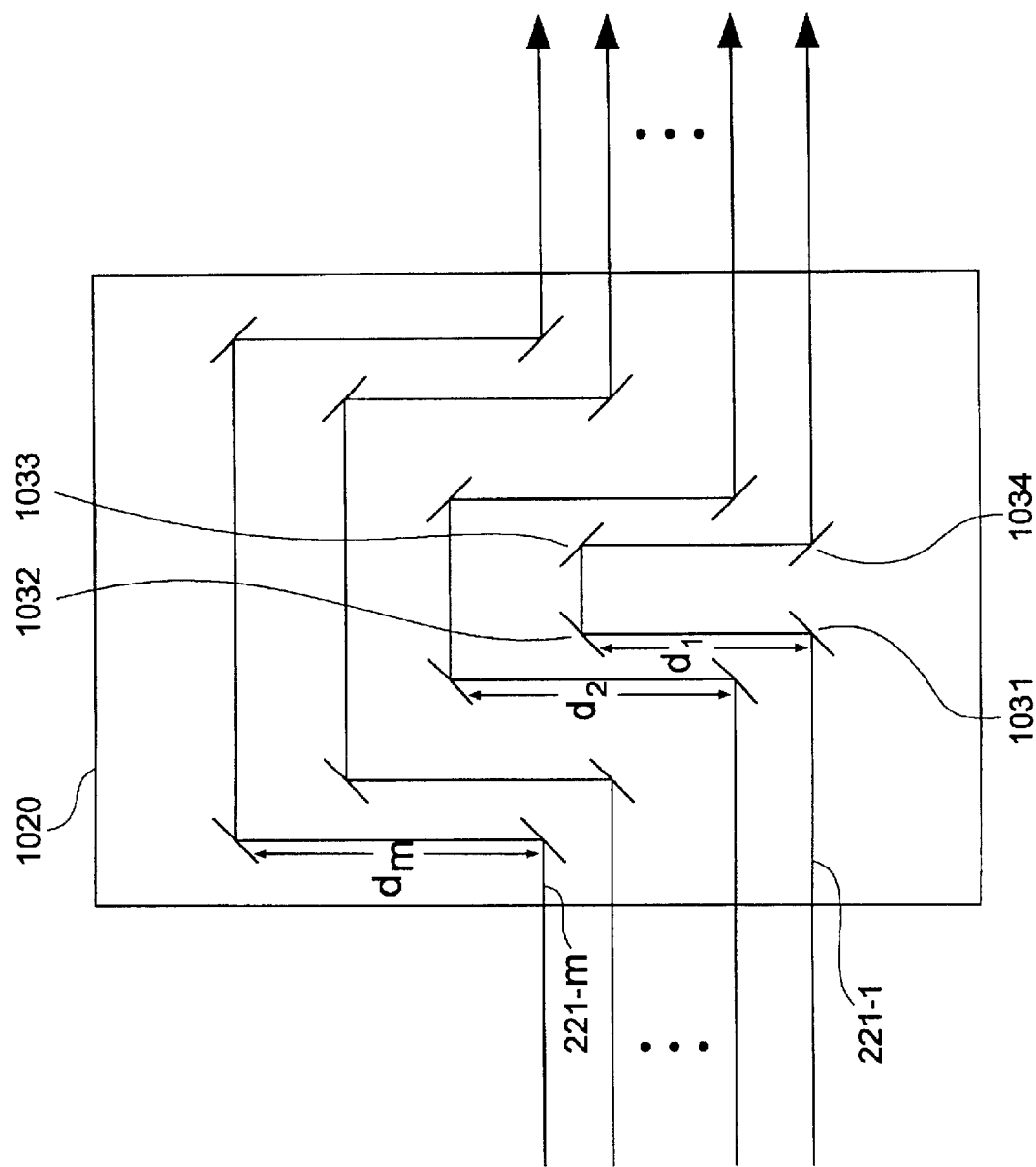
FIG. 13 is a schematic view of an alternative arrangement for a two dimensional variable path length element using mirror switches.

FIG. 13 shows another alternative exemplary embodiment of the invention, in which a variable path length element 1020 can impart the path length differences $2d_1$, ..., $2d_m$. For example, in this embodiment, path section 221-1 can impart an additional path length of $2d_1$ to path 245-1, where $d_1$ is the path length between mirrors 1031 and 1032 and between mirrors 1033 and 1034. Similarly, path section 221-m can impart an additional path length of $2d_m$ to path 245-m. In each actuated path section, the beam incurs reflection from only four mirrors, thereby not undergoing additional reflection losses from additional mirrors as in other embodiments.

While the devices described above use a two dimensional MEMS waveguide device as the variable path length element, the person of skill in the art will recognize that other known devices may be used to provide the variable path length element in a planar controllable demultiplexer/multiplexer device. For example, a liquid crystal crossconnect switch analogous to the MEMS switch fabric described above may be used as the variable path length element. Such devices use liquid crystal-filled trenches positioned at the intersections of orthogonal waveguides to effect switching by controllably creating total internal reflection conditions at the trench-waveguide interface. Liquid crystal crossconnect switches are described in detail in commonly pending and co-owned U.S. patent applications Ser. No. 09/604,039, filed on Jun. 27, 2000, and Ser. No. 09/431,430, filed Nov. 1, 1999, which are incorporated herein by reference in their entirety. For example, a liquid crystal crossconnect switch fabric can be substituted for one or more of the variable path length sections 221-1 to 221-n shown in FIG. 4.

Alternatively, a bubble-based optical switch fabric, which creates total internal reflection conditions at waveguide-trench interfaces by selectively filling trenches with gas bubbles, may be used as the variable path length element. Bubble-based devices are described, for example, in U.S. Pat. No. 6,212,308, which is incorporated herein by reference in its entirety. For example, a bubble-based optical switch fabric can be substituted for one or more of the variable path length sections 221-1 to 221-n shown in FIG. 4.

In a further alternative embodiment, the variable path length element may also include an array of Mach-Zehnder interferometer (MZI) switches, such as the one described in commonly pending and co-owned application Ser. No. 09/603,550, filed on Jun. 26, 2000, which is incorporated herein by reference. In this device, Mach-Zehnder interferometers form the waveguide intersections used to switch light between paths. For example, an array of MZI switches can be substituted for one or more of the variable path length sections 221-1 to 221-n shown in FIG. 4. As the skilled artisan will recognize after reading this disclosure, other structures may be used to increase the physical length of the paths 245-1, ..., 245-m in accordance with the present invention.

Figure 1:
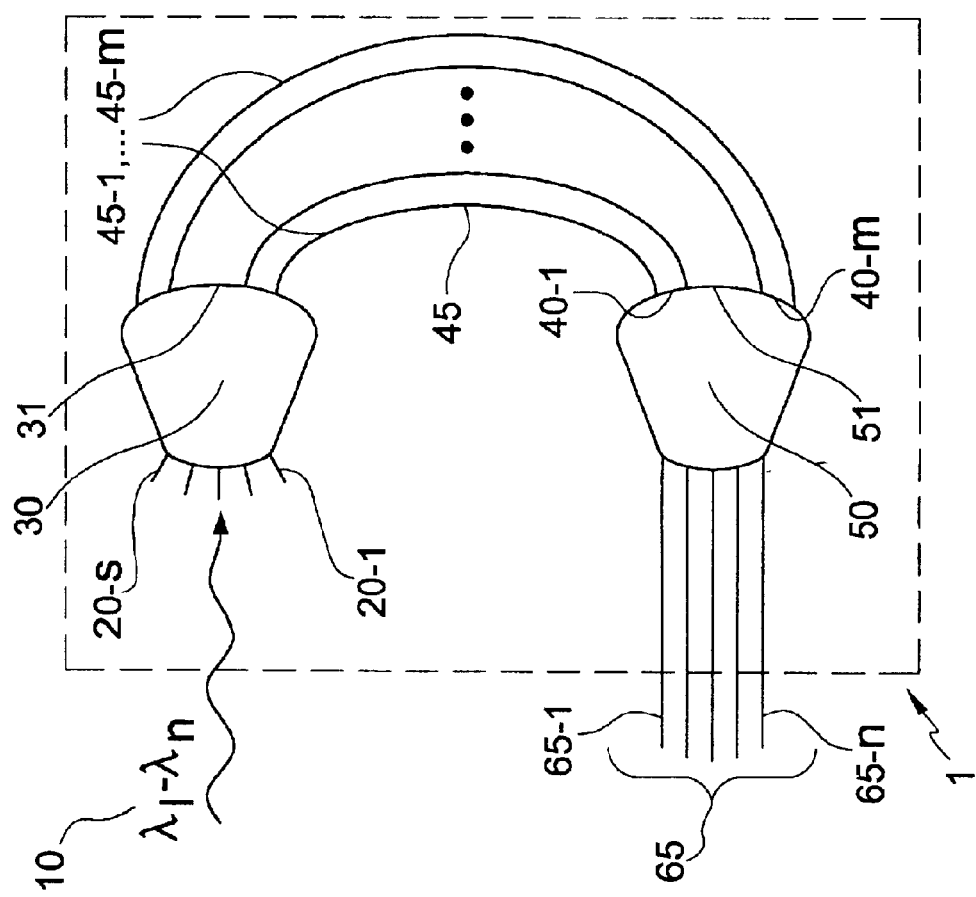
FIG. 1 is a schematic view of a conventional prior art arrayed waveguide grating (AWG).
Figure 2:
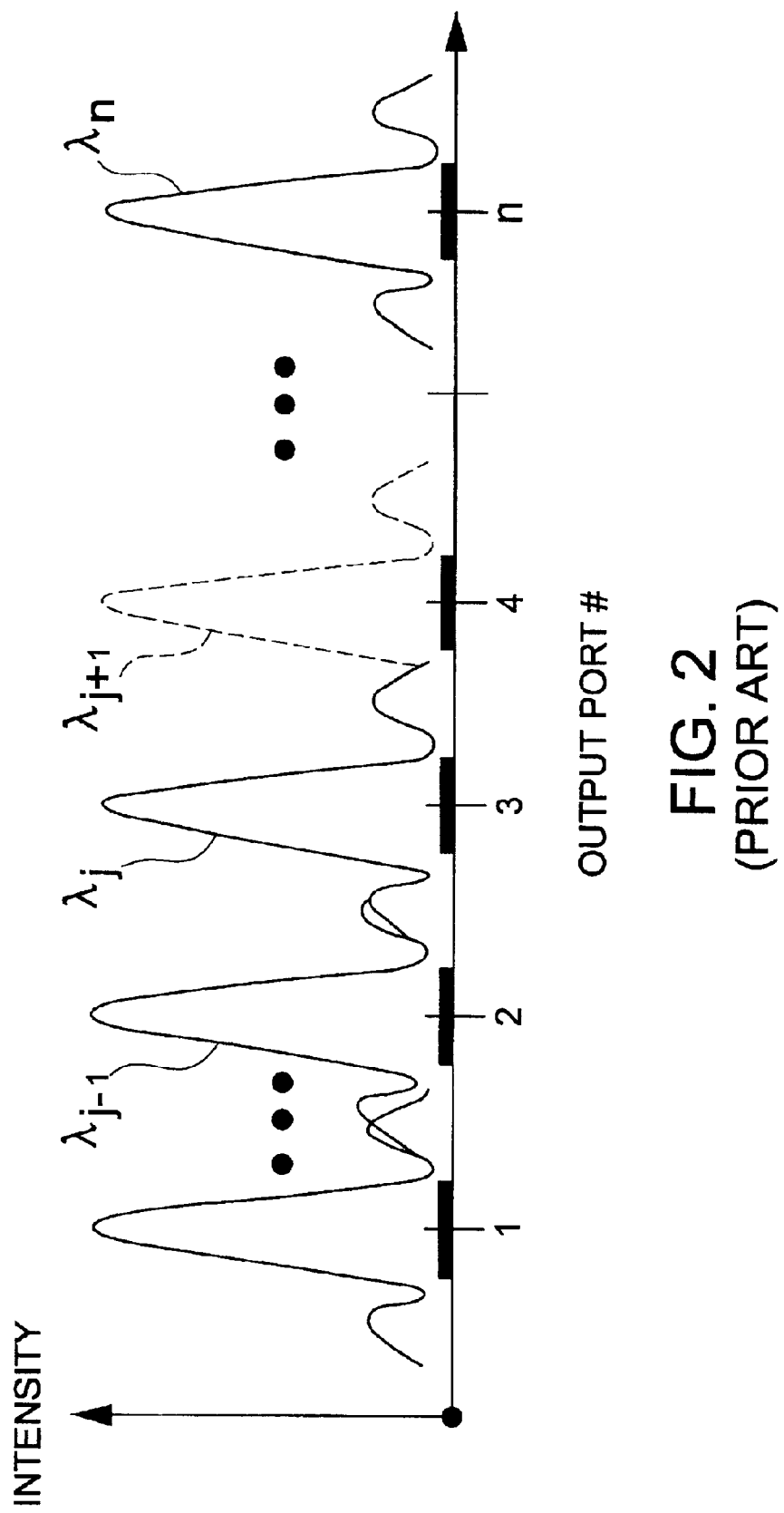
FIG. 2 is a plot of relative intensity versus output port for a conventional prior art AWG.
Figure 14:
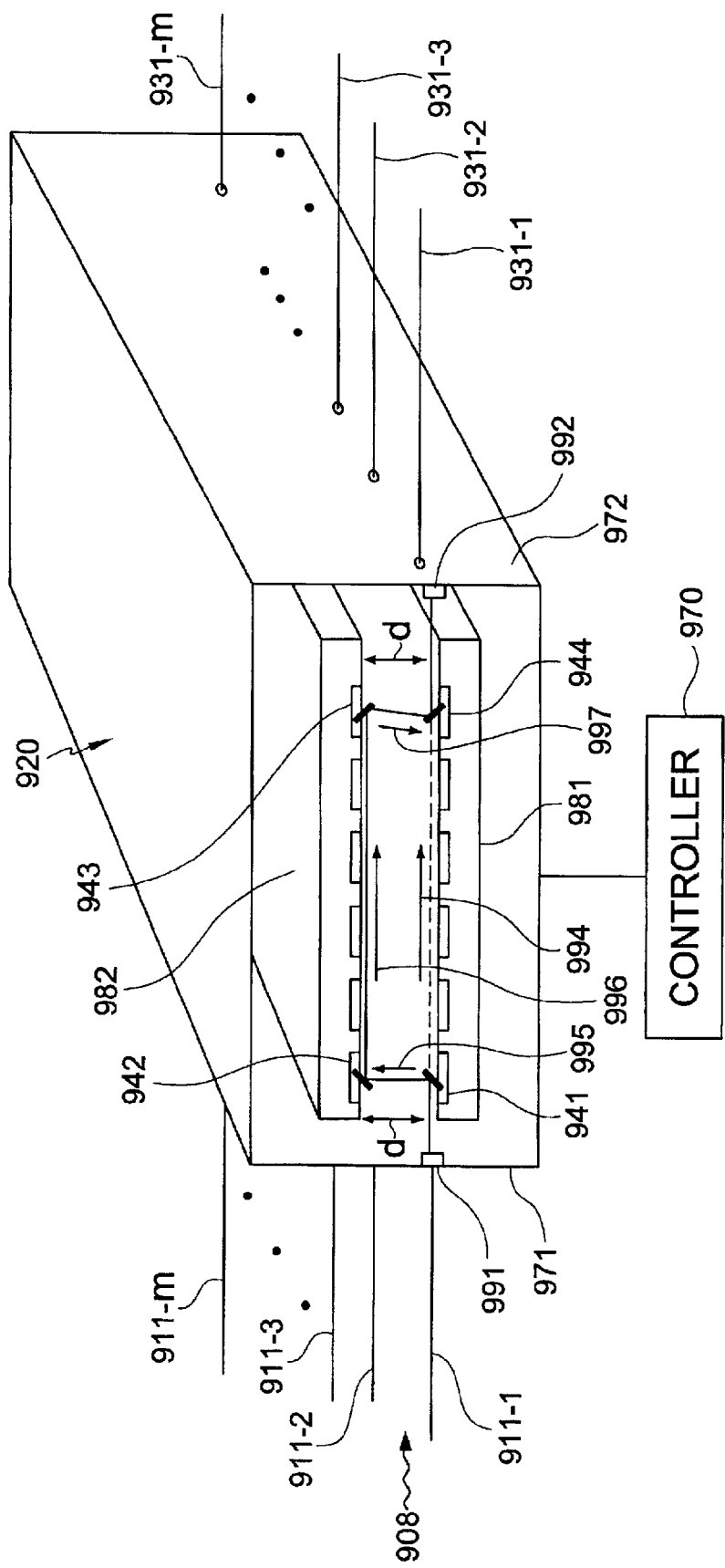
FIG. 14 is a side perspective view of a multiplexer/demultiplexer device having a controlled variable path length element that provides a controlled incremental path length difference in free-space using a three dimensional switching structure according to another embodiment of the present invention.
Figure 15:
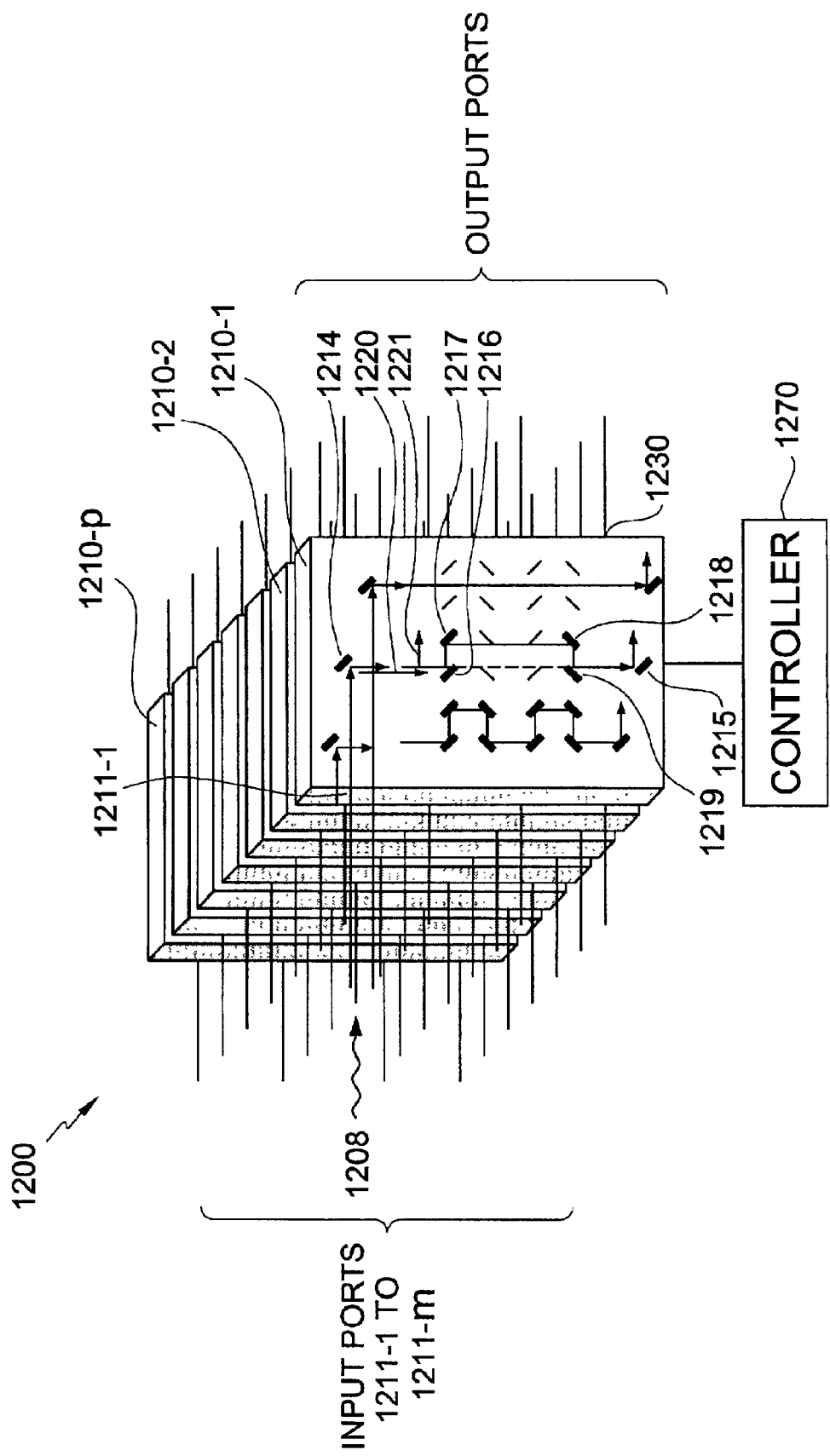
FIG. 15 is a side perspective view of an alternative configuration of a three dimensional switch matrix according to another embodiment of the present invention.
Figure 16:
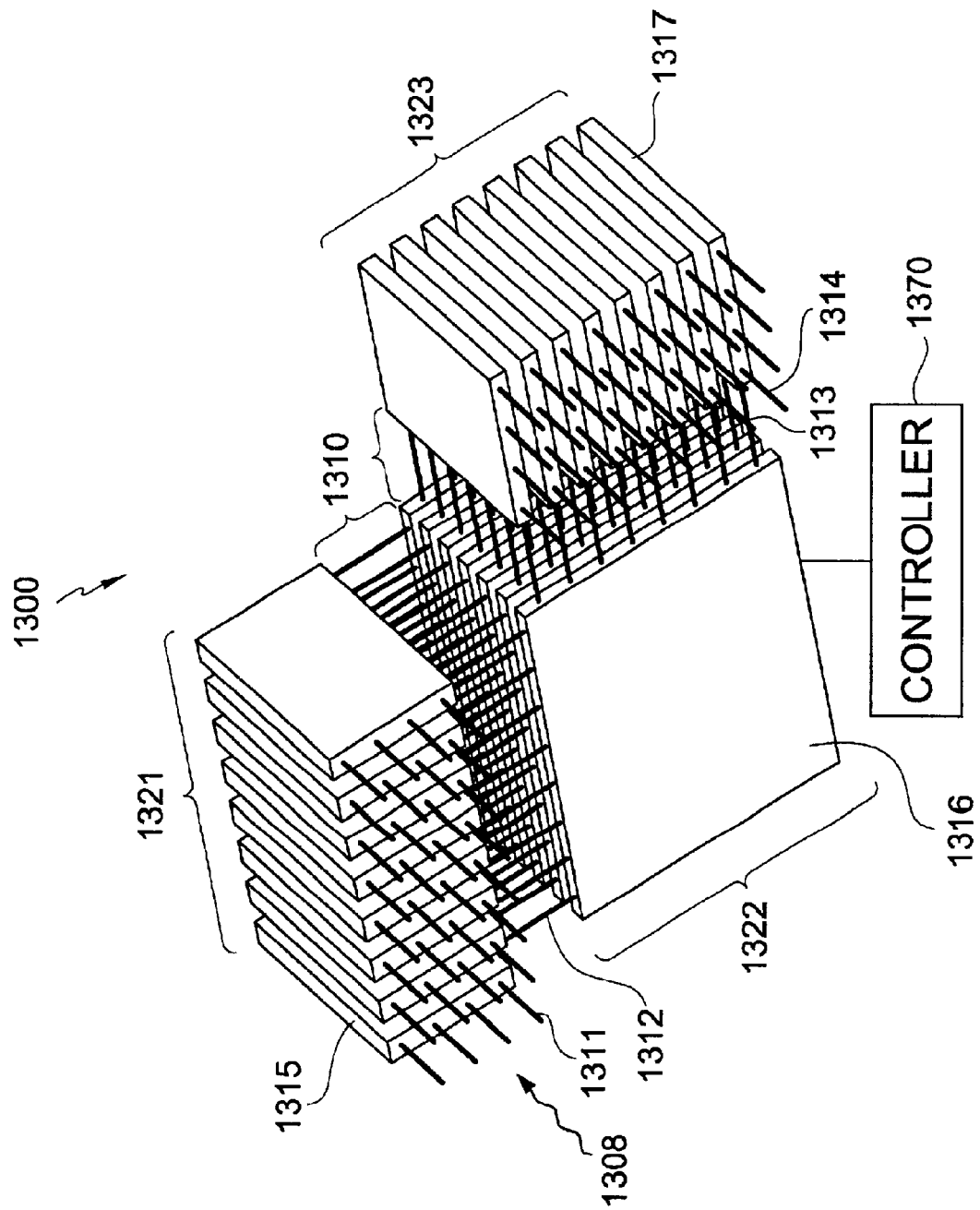
FIG. 16 is a perspective view of another alternative configuration of a three dimensional switch matrix according to another embodiment of the present invention.

As previously stated, the multiplexer/demultiplexer device having a controlled variable path length element (and/or one or more of its components) can be constructed as a non planar device. FIGS. 14, 15 and 16 show examples of such devices. As in the previous embodiments, a multiplexed optical signal can be distributed to m paths by a beam distribution element, such as element 130 from FIG. 2. In FIGS. 14, 15 and 16, the beam distribution and beam interaction elements are not shown for the sake of simplicity.

FIG. 14 shows an alternative embodiment of the present invention, where the variable path length element 920 provides a controlled incremental path length difference in free-space using a three dimensional switching structure. After the multiplexed optical signal is distributed to m paths, a first optical beam 908 can then be coupled to an entrance face 971 of variable path length element 920 via a waveguide 911-1. As described previously, the connection or bridge between the m path lines with the variable path length element can be a coupling structure such as a monolithic coupler, a plurality of optical fiber couplers, a plurality of waveguides or optical lenslet collimators. In this embodiment, the optical beam 908 enters variable path length element via a beam collimator 991, which can be a GRIN lens, a ball lens, a micro-molded lens array, or the like, to collimate the optical beam.

Variable path length element 920 further comprises a first MEMS micro-mirror switch array 981 and a second MEMS micro-mirror switch array 982. In this embodiment, the first and second MEMS arrays are disposed opposite and facing one another. Each MEMS micro-mirror switch array comprises a matrix of moveable mirrors, e.g., a 16×16 mirror matrix, a 32×32 mirror matrix, and so on. Examples of a moveable mirror matrix for a projection system are known, such as in Texas Instruments' DMD product.

For example, as beam 908 propagates through free-space along path 994, if a mirror, such as mirror 941 is actuated, the beam will be reflected in a direction 995 towards another mirror, such as mirror 942. In one preferred arrangement, first MEMS micro-mirror switch array 981 and second MEMS micro-mirror switch array 982 are spaced apart by an incremental path length difference d. In this example, beam 908 propagates from mirror 941, along path 995, is reflected off mirror 942 along path 996, is reflected off mirror 943 along path 997, and is reflected off mirror 944 towards the output face 972 of variable path length element 920. Similar or different beam paths can be provided for multiple input signals from waveguides 911-2, . . . , 911-m. Thus, the effective incremental path difference traversed by beam 908 can be dynamically modified to be +2d. Due to the structure shown in FIG. 14, a variety of different beam paths can be established within variable path length element 920, thus providing even further flexibility in dynamically altering the physical path lengths traversed by the plurality of beams entering the structure. The different beam paths can be controlled by controller 970 to provide sequential and/or non sequential effective incremental path differences, as described previously. An optical coupler 992 is provided to collect and/or focus beam 908 into receiving waveguide 931-1. The optical beam can then enter a beam interaction element, such as element 150, shown in FIG. 3. Beams are transmitted to receiving waveguides 931-2, . . . , 931-m in a similar manner. Demultiplexing can thus occur in a like manner to that described above.

FIG. 15 shows a variable path length element 1200, comprising an array of m parallel two dimensional MEMS switch arrays 1210-1 to 1210-p. After the multiplexed signal is distributed to m paths by a beam distribution element, such as element 130 from FIG. 3, a first optical beam, 1208 can be directed to a first two dimensional MEMS switch array, 1210-1, via input port 1211-1. The two dimensional switch arrays used in this embodiment may be, for example, a free space micromachined optical switch, such as described in U.S. Pat. No. 5,960,132, which is incorporated herein by reference. In these devices, which are understood in the art, two dimensional arrays of freely rotating MEMS mirrors reflect collimated optical beams along orthogonal paths. Using these free space MEMS-based optical switch fabric, d can be designed to be on the order of about 1 millimeter. For this mirror spacing, a Gaussian beam divergence loss has been calculated to be about 1.3 dB after 65 mirrors are traveled. This result is equivalent to about a 10.7 cm distance in free space, for a mirror radius of about 300 $\mu$m. Electrostatic actuation time for such a MEMS-based optical switch fabric can be about 1 to 5 milliseconds.

In this embodiment, an individual two dimensional MEMS switch array operates in the same manner as switch array 220 in FIG. 4, such that beam 1208 is reflected by mirror 1214 in a direction, 1220. If mirror 1216 is actuated, the beam will be reflected in direction 1221, towards another mirror, 1217. Mirrors 1216 and 1217 and mirrors 1218 and 1219 can be spaced from each other at a distance of d, such that, if mirrors 1216, 1217, 1218 and 1219 are actuated, beam 1208 follows path 1221 to output port 1230, with a path length increase of 2d. If none of mirrors 1216, 1217, 1218 and 1219 are actuated, beam 1208 may follow path 1220 to output port 1230 with no path length increase. As in the previous embodiments, different physical beam paths can be provided for the multiple input signals from input ports 1211-1 to 1211-m, such that the path length increase can be a multiple of d. Additionally, the mirrors can be controlled by controller, 1270, thus providing sequential or non-sequential effective incremental path differences as described previously. As described previously, beam 1208 can then enter a beam interaction element, such as element 150 shown in FIG. 3, via an optical coupler and a waveguide such as optical coupler 992 and waveguide 931 in FIG. 14. As with variable path length element 220 in FIG. 4, variable path length element 1200 in FIG. 15 can be coupled to a controller, here controller 1270.

FIG. 16 shows a further variable path length element 1300 comprising three sets of two dimensional MEMS switch arrays. The three sets can be coupled to one another by a coupling device, such as a plurality of waveguides 1310, and each set can operate in the same way as the variable path length element 1200 in FIG. 15. In this way, signal 1308 enters two dimensional MEMS switch array 1315 in set 1321 via input 1311. After passing through a first variable path length element, signal 1308 is directed to two dimensional MEMS switch array 1316 in set 1322 via coupler 1312. Signal 1308 then traverses a second path length element and is directed to two dimensional MEMS switch array 1317 in set 1323 via coupler 1313. Finally, signal 1308 traverses a third path length element and is directed to output 1314. As described previously, beam 1308 can then enter a beam interaction element, such as element 150 shown in FIG. 3, via an optical coupler and a waveguide such as optical coupler 992 and waveguide 931 in FIG. 14. Again, the mirrors can be controlled by a controller 1370, thus providing sequential or non-sequential incremental path differences as described previously.

Figure 17:
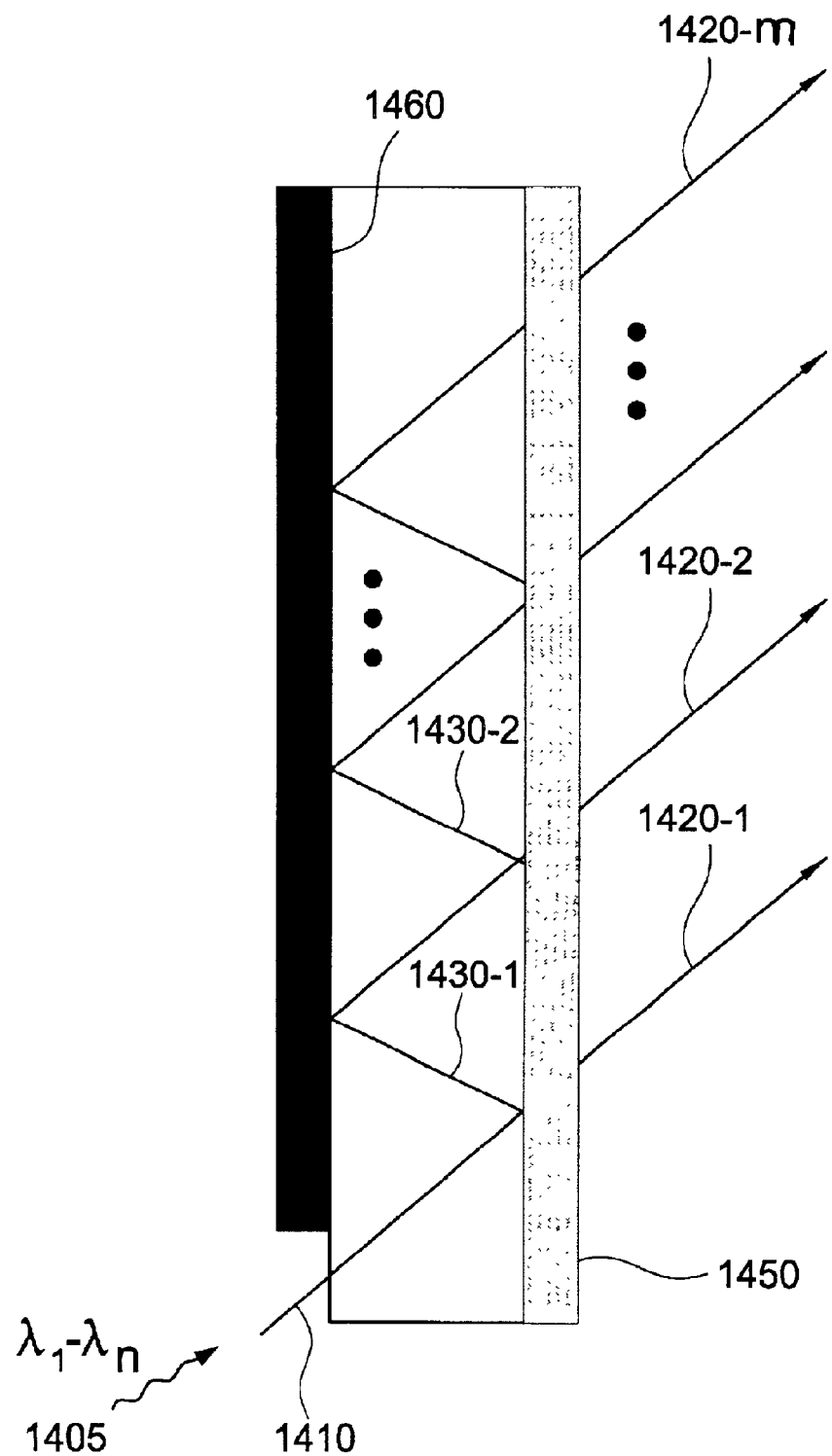
FIG. 17 is a schematic diagram of an alternative configuration of an example homogeneous expansion medium, a beam splitter with multiple outputs.

A beam distribution element for use in non planar embodiments of the device of the present invention is shown in FIG. 17. FIG. 17 shows a beam splitter that may be used as optical element 130, whereby signal 1405 enters the beam splitter 1400 via input 1410 and encounters variably partially reflecting surface 1450, which transmits a portion of signal 1405 as beam 1420-1 and reflects another portion, beam 1430-1. Beam 1430-1 is then reflected by totally reflecting surface 1460 and is split by surface 1450 into transmitted beam 1420-2 and reflected beam 1430-2. This process of transmission and reflection continues creating a plurality of output beams 1420-1 to 1420-m.

As the person of skill in the art will realize given the present description, other combinations of optical elements may be used to construct the devices of the present invention. For example, a device may include both planar and non planar elements. In an exemplary embodiment of such a device, the beam distribution element and the beam interaction element as well as the coupling waveguides are formed in a planar waveguide, while the variable path length element is, for example, a free space micromachined optical switch of the type described above. Grin lens collimators may be used to couple the planar sections of the device to the non planar section of the device.

According to another embodiment of the present invention, a multiplexer/demultiplexer device having a controlled variable path length element can further include built-in variable optic attenuation capabilities. Attenuation can be achieved by utilizing one or more tiltable mirror elements or one or more partially actuatable mirror elements.

Figure 18:
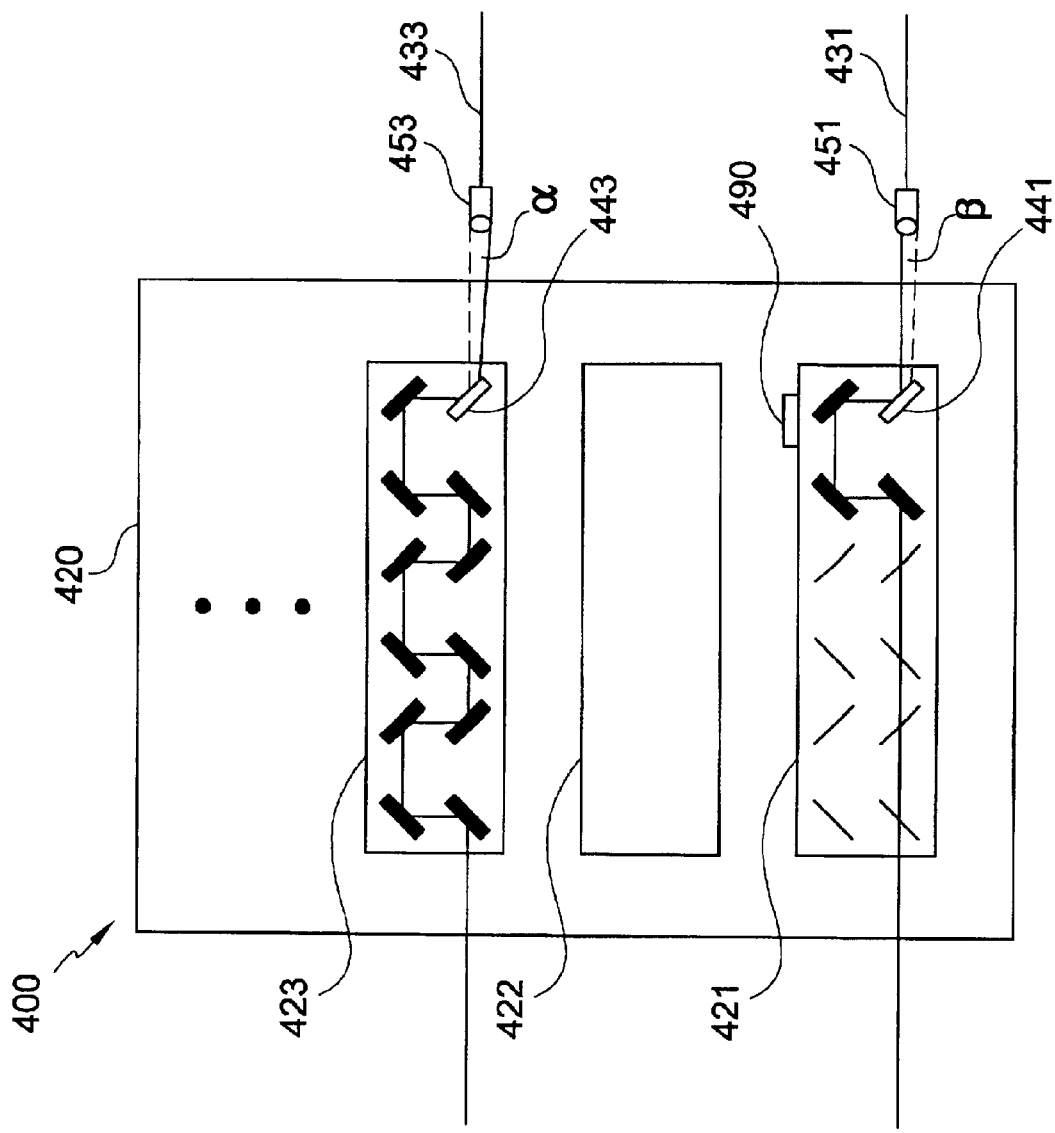
FIG. 18 is a schematic diagram of a multiplexer/demultiplexer device having a controlled variable path length element according to another embodiment of the present invention, in particular, providing built-in variable optic attenuation.

For example, FIG. 18 shows a multiplexer/demultiplexer device 400 having a controlled variable path length element 420 (other parts of device 400 are omitted for simplicity). In this alternative embodiment, one or more path sections, such as path sections 421 and 423, can include one or more switch elements that variably deflect or partially reflect an incident beam in more than one direction. For example, in a free space MEMS-based optical switch fabric embodiment such as shown in FIG. 18, final MEMS mirrors 441 and 443 are configured to be angularly adjustable or tiltable (in horizontal, vertical, or both directions) using a known gimbal mount structure. In the planar two dimensional MEMS device, a partially actuatable cantilevered mirror can be utilized. Partial actuation is also possible in bubble-based, liquid crystal-based, and Mach Zehnder interferometer-based devices.

In this arrangement, an incident beam can be directed off-axis from a receiving waveguide (e.g., waveguide 431 or 433) by some angle (e.g., $\beta$ or $\alpha$), so that only a controllable portion of the beam is received by the receiving waveguide. For example, a degree of tilt can correspond to the amount of actuation signal applied to the particular MEMS mirror. Preferably, the off-axis angle can de directed automatically by the controller.

Thus, a variable intensity control is accomplished within the respective path sections which couples the respective output beams into their respective waveguides to the second optical element. This arrangement can facilitate a true flat-top amplitude across all channels, instead of, for example, a Gaussian distribution. In this embodiment, the connection or the bridge between the output m parallel optical path-lines with the second optical element can be provided through optical fiber couplers (e.g., couplers 451 and 453). Other devices (e.g. lenslet collimators or waveguides for a planar device) can also or alternatively be included depending on the configuration of the variable path length element that is utilized.

Multiple applications of further embodiments can be realized given the present description. For example, according to another embodiment of the present invention, the multiplexer/demultiplexer device can be implemented as a selectable multiplexer/demultiplexer or an ordinary optical switch fabric (OSF). In such an arrangement, input and output ports for a multiplexer/demultiplexer can be placed opposite input and output ports for an OSF, such that opposite sides of the same mirrors are used to direct beams for the two different functions.

In a further alternative embodiment, a multiplexer/demultiplexer device having a controlled variable path length element can further include built-in path verification by making the switching elements semi-transparent and utilizing one or more detectors, such as photodetector 490 (see FIG. 18). For example, MEMS mirrors can be made partially transmissive as would be apparent to one of ordinary skill in the art given the present description. Bubble elements, liquid crystal elements, and Mach-Zehnder interferometer elements may also be designed and/or actuated to be partially transmissive. Also, dynamic path length trimming, and a built-in slab configuration, where each first mirror is partially coated for all path sections can be provided.

As the person of skill in the art will appreciate, the use of a variable path length element can impart a wide range of operational capabilities to devices such as those described herein. For example, a device in which the unactuated paths are equal performs no optical transformation in the unactuated state; an optical signal having one or more wavelengths entering the device from the central input will propagate through the device and emerge substantially unchanged from the central output of the device, as is appreciated by the skilled artisan. The path sections of the variable path length element may actuated as described above to demultiplex the optical signal. Alternatively, the variable path length element may be actuated so that each path section adds a length of 2d to the corresponding path. The last mirror in each path section may be angularly adjustable as described above in connection with FIG. 18. By adjusting the angles of the last mirrors of the path sections, the optical signal may be attenuated. As each path has the same length, there is no path length difference, and hence no demultiplexing. The attenuated optical signal will emerge from the central output of the device. Thus, such a device may be used as a variable optical attenuator or a demultiplexer. Many other configurations will become apparent to the skilled artisan in light of the disclosure of the current invention.

While the above provides a full and complete disclosure of the preferred embodiments of the present invention, various modifications, alternate constructions, and equivalents may be employed without departing from the scope of the invention. Therefore, the above description and illustration should not be construed as limiting the scope of the invention, which is defined by the appended claims.

We claim:

1. An optical device to receive an input optical signal having one or more wavelengths, said device comprising:
    (a) a beam distribution element to receive the input optical signal and distribute it into a plurality of beams;
    (b) a variable path length element to receive the plurality of beams from the beam distribution element, wherein the variable path length element comprises a plurality of path sections, wherein a length of at least one of said path sections is variable; and
    (c) a beam interaction element to receive the plurality of beams from the variable path length element,
    wherein the plurality of beams interact in the beam interaction element.

2. The optical device according to claim 1, further comprising:
a plurality of exit ports to receive the interacted beams from the beam interaction element,
wherein a first exit port receives a first demultiplexed optical signal having a first wavelength and a second exit port receives a second demultiplexed optical signal having a second wavelength different from the first wavelength.

3. The optical device according to claim 2, further comprising:
a controller operatively coupled to the variable path length element to vary the length of the at least one of said path sections.

4. The optical device according to claim 3, wherein a first path section is set to a first physical path length by the controller and a second path section is set to a second physical path length by the controller, wherein the first physical path length is different from the second physical path length.

5. The optical device according to claim 3, wherein the variable path length element comprises an optical switch fabric.

6. The optical device according to claim 3, wherein the variable path length element comprises a two dimensional optical switch fabric.

7. The optical device according to claim 6, wherein a first path section comprises a first plurality of MEMS mirrors, and
wherein, when actuated, at least one of the first plurality of mirrors is disposed in a first optical beam path to increase the total physical path length traversed by a first optical signal.

8. The optical device according to claim 7, wherein the mirrors of the first plurality of MEMS mirrors are spaced from each other by a given distance, such that nearest neighbor mirrors are spaced apart by a same distance d.

9. The optical device according to claim 8, wherein the first path section imparts a first delay on the first beam proportional to d and a second path section imparts a second delay on a second light beam from the distributed beams proportional to kd, where k is an integer value.

10. The optical device according to claim 8, wherein the first path section is controllably adjustable to impart a first or second delay on the first light beam proportional to d, wherein the first and second delays are different.

11. The optical device according to claim 7, further comprising:
a receiving waveguide coupling the variable path length element to the beam interaction element,
wherein the first plurality of mirrors is a first plurality of cantilevered mirrors, and at least one of said first plurality of cantilevered mirrors controls an intensity of a first light beam reflected from said at least one cantilevered mirror into the receiving waveguide.

12. The optical device according to claim 7, wherein at least one of the first plurality of MEMS mirrors is partially actuatable.

13. The optical device according to claim 1, wherein the beam distribution element is a star coupler.

14. The optical device according to claim 1, wherein the beam distribution element is a planar waveguide slab.

15. The optical device according to claim 1, further comprising:
a first coupling structure optically connecting the beam distribution element to the variable path length element; and
a second coupling structure optically connecting the beam interaction element to the variable path length element.

16. The optical device according to claim 15, wherein the first coupling structure is a plurality of waveguides corresponding to a number of path sections of the variable path length element.

17. The optical device according to claim 15, wherein the first coupling structure is a monolithic structure.

18. The optical device according to claim 15, wherein the first coupling structure comprises a plurality of optical fibers.

19. The optical device according to claim 1, wherein the variable path length element comprises a first liquid crystal crossconnect device comprising one or more liquid crystal switches to reflect a first incident beam from the distributed beams, such that, when actuated, said liquid crystal switches increase the length of a first optical beam path.

20. The optical device of claim 1, wherein the variable path length element includes a plurality of switching elements, and
wherein at least one of the switching elements controls an intensity of a light beam received by the beam interaction element.

21. The optical device according to claim 1, wherein the variable path length element comprises a three dimensional switching structure to impart an incremental path length difference in free space.

22. The optical device according to claim 21, wherein the three dimensional switching structure comprises a first moveable mirror array and a second moveable mirror array.

23. The optical device according to claim 22, wherein the first and second moveable mirror arrays are disposed facing one another.

24. The optical device according to claim 21, wherein the three dimensional switching structure comprises an array of at least two parallel two dimensional MEMS switch arrays.

25. The optical device according to claim 1, wherein the variable path length element comprises a first bubble-based optical switch device comprising one or more bubble-based switches to reflect a first incident beam from the distributed beams, such that, when actuated, said bubble-based switches increase the length of a first optical beam path.

26. The optical device according to claim 1, wherein the variable path length element comprises a first Mach-Zehnder interferometer (MZI) switch fabric comprising one or more MZI switches to direct a first incident beam to one of two arms, such that when actuated, said MZI switches increase the length of a first optical beam path.

27. An optical device for multiplexing/demultiplexing an optical signal, comprising:
(a) an input waveguide comprising a first end and second end;
(b) a beam distribution element to receive the optical signal emanating from the second end of the input waveguide and to distribute optical signal in more than one dimension;
(c) a variable path length element to receive first and second beams of the distributed optical signal, wherein the variable path length element comprises a plurality of path sections,
wherein a length of at least one of said path sections is variable,
wherein the first beam propagates along a first path section and the second beam propagates along a second path section,
wherein the first path section is set to a first path length in a first state and the first path section is set to a second path length in a second state, and
wherein the first and second path lengths are different.

28. The optical device according to claim 27, further comprising:
(a) a first lens to collimate the first beam of the distributed optical signal and to direct the first beam along the first path section;
(b) a second lens to collimate the second beam of the distributed optical signal and to direct the second beam along the second path section; and
(c) a third lens to focus an output of the variable path length element.

29. The optical device according to claim 27, further comprising:
(a) a first coupling structure optically connecting the beam distribution element to an input of the variable path length element; and
(b) a second coupling structure optically connecting the variable path length element to the beam interaction element, which separates a first wavelength component from the optical signal and directs the first wavelength component to a first output port and that separates a second wavelength component of the first beam and directs the second wavelength component to a second output port.

30. The optical device according to claim 29, wherein:
(a) the first coupling structure comprises a first plurality of m waveguides, wherein each of said first plurality of m waveguides is coupled to a different path section of the variable path length element; and
(b) the second coupling structure comprises a second plurality of m waveguides, wherein each of said second plurality of m waveguides is coupled to an output of a different path section.

31. A method of demultiplexing a multiplexed optical signal, comprising:
(a) distributing the optical signal into a plurality of beams;
(b) directing the plurality of beams to a variable path length element,
wherein the variable path length element comprises a plurality of path sections corresponding to a number of distributed beams,
wherein a first beam of the plurality of beams propagates along a first path section and a second beam of the plurality of beams propagates along a second path section,
wherein the first path section is set to a first path length in a first state and the first path section is set to a second path length in a second state, wherein the first and second path lengths are different, and
wherein the second path section is set to a third path length in a first state and the second path section is set to a fourth path length in a second state, wherein the third and fourth path lengths are different; and
(c) directing the first and second beams from the variable path length element into a beam interaction element,
wherein a first exit port of the beam interaction element receives a first output beam having a first wavelength and a second exit port of the beam interaction element receives a second output beam having a second wavelength, said first and second wavelengths being different.

32. The method according to claim 31, further comprising:
providing an incremental path length difference for each of said plurality of path sections.

33. The method according to claim 31, further comprising:
instructing the variable path length element to change from the first state to the second state.

34. The method according to claim 31, further comprising:
attenuating an intensity of the first beam.

* * * * *